US009392552B2

(12) United States Patent
Noh

(10) Patent No.: US 9,392,552 B2
(45) Date of Patent: *Jul. 12, 2016

(54) CONTROLLING TRANSMIT POWER OF UPLINK SOUNDING REFERENCE SIGNAL

(71) Applicant: KT CORPORATION, Gyeonggi-do (KR)

(72) Inventor: Min Seok Noh, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,690

(22) Filed: Apr. 14, 2015

(65) Prior Publication Data

US 2015/0223180 A1 Aug. 6, 2015

Related U.S. Application Data

(62) Division of application No. 13/927,373, filed on Jun. 26, 2013, now Pat. No. 9,094,924.

(30) Foreign Application Priority Data

Jul. 12, 2012 (KR) .................. 10-2012-0076264
Aug. 24, 2012 (KR) .................. 10-2012-0093331
Dec. 12, 2012 (KR) .................. 10-2012-0144490

(51) Int. Cl.
*H04W 4/00* (2009.01)
*H04W 52/36* (2009.01)
*H04L 5/00* (2006.01)
*H04W 52/32* (2009.01)

(52) U.S. Cl.
CPC ............ *H04W 52/362* (2013.01); *H04L 5/0035* (2013.01); *H04L 5/0048* (2013.01); *H04W 52/325* (2013.01)

(58) Field of Classification Search
USPC ......... 370/329, 330, 338, 339, 341, 389, 431, 370/465, 491, 500; 455/522, 67.11, 501, 455/340
See application file for complete search history.

(56) References Cited

U.S. PATENT DOCUMENTS

| 9,094,924 | B2 * | 7/2015 | Noh ............... H04W 52/362 |
| 2012/0094610 | A1 | 4/2012 | Lunden et al. |
| 2012/0202544 | A1 | 8/2012 | Kim et al. |
| 2013/0078913 | A1 | 3/2013 | Lee et al. |
| 2013/0121279 | A1 | 5/2013 | Noh et al. |

FOREIGN PATENT DOCUMENTS

| KR | 10-2010-0048572 A | 5/2010 |
| KR | 10-2011-0018790 A | 2/2011 |

(Continued)

OTHER PUBLICATIONS

Huawei, Hisilicon, "Power control design for UL CoMP scenario 3 and 4", R1-113648, 3GPP TSG RAN WG1 Meeting #67, San Francisco, USA, Nov. 14-18, 2011.

(Continued)

*Primary Examiner* — Chi H Pham
*Assistant Examiner* — Alexander O Boakye
(74) *Attorney, Agent, or Firm* — IP Legal Services, LLC

(57) ABSTRACT

The disclosure is related to controlling a transmit power of an uplink sounding reference signal.

6 Claims, 17 Drawing Sheets

(56) References Cited

FOREIGN PATENT DOCUMENTS

| KR | 10-2011-0133448 A | 12/2011 |
| KR | 10-2011-0134262 A | 12/2011 |

OTHER PUBLICATIONS

CMCC, "Discussion on SRS Power Control Enhancement", R1-122712, 3GPP TSG RAN WG1 Meeting #69, Prague, Czech Republic, May 21-25, 2012.

Ericsson, St-Ericsson, "Details about SRS power control", R1-123743, 3GPP TSG RAN WG1 Meeting #70, Qingdao, China, Aug. 13-17, 2012.

Shart, "SRS power control for UL CoMP", R1-122384, 3GPP TSG RAN WG1 Meeting #69, Prague, Czech Republic, May 21-25, 2012.

Korean Intellectual Property Office, International Search Report for International Application No. PCT/KR2013/005567, Oct. 21, 2013.

Korean Intellectual Property Office, Written Opinion of the International Searching Authority for International Application No. PCT/KR2013/005567, Oct. 21, 2013.

Samsung, "SRS Transmission Power Control for CoMP", R1-122246, 3GPP TSG RAN WG1 #69, Prague, Czech Republic, May 21-25, 2012.

Huawei, "List of RRC parameters for UL CoMP", R1-124033, 3GPP TSG RAN WG1 Meeting #70, Qingdao, China, Aug. 13-17, 2012.

Huawei, Hisilicon, "Draft CR to 36.331 on RRC support for CoMP in UL", R2-125133, 3GPP TSG-RAN WG2 Meeting #79bis, Bratislava, Slovakia, Oct. 8th-12th, 2012.

\* cited by examiner

CONTROLLING TRANSMIT POWER OF UPLINK SOUNDING REFERENCE SIGNAL

CROSS REFERENCE TO PRIOR APPLICATIONS

The present application is a divisional of pending U.S. patent application Ser. No. 13/927,373 (filed on Jun. 26, 2013), which claims priority under 35 U.S.C. §119 to Korean Patent Application No. 10-2012-0076264 (filed on Jul. 12, 2012), Korean Patent Application No. 10-2012-0093331 (filed on Aug. 24, 2012), and Korean Patent Application No. 10-2012-0144490 (filed on Dec. 12, 2012), which are hereby incorporated by reference in their entirety.

BACKGROUND

The present disclosure relates to controlling a transmit power of an uplink sounding reference signal.

In a coordinated multi-point transmission/reception system (CoMP system), at least two of transmission and reception points cooperate with each other to transmit signals. Such a CoMP system measures an uplink channel state for uplink frequency-dependent schedule and measures an uplink/downlink channel for downlink beam-forming using channel reciprocity. In order to measure the uplink channel state and the uplink/downlink channel, transmission of a sounding reference signal (SRS) is required.

SUMMARY

In accordance with at least one embodiment, a method may be provided for controlling a transmit power of an uplink sounding reference signal (SRS) in a transmission/reception point. The method may include determining an offset value for an uplink SRS transmit power of user equipment, using a constant step size in an entire range including a first range and a second range, wherein the first range is a base range, and the second range includes comparatively larger values than the first range; and transmitting offset information indicating the determined offset value to the user equipment through higher-layer signaling.

In accordance with another embodiment, a method may be provided for controlling a transmit power of an uplink sounding reference signal (SRS) in user equipment. The method may include receiving offset information indicating a specific offset value for an uplink SRS transmit power, from a transmission/reception point, wherein the specific offset value is determined using a constant step size in an entire range including a first range and a second range, the first range is a base range, and the second range includes comparatively larger values than the first range; and transmitting the uplink SRS with the uplink SRS transmit power based on the specific offset value indicated by the offset information.

In accordance with still another embodiment, a transmission/reception point may be provided. The transmission/reception point may include a control unit configured to determine an offset value for a transmit power of an uplink SRS of user equipment, using a constant step size in an entire range including a first range and a second range, wherein the first range is a base range, and the second range includes comparatively larger values than the first range; and a transmitting unit configured to transmit offset information indicating the determined offset value to the user equipment through higher-layer signaling.

In accordance with still another embodiment, user equipment may be provided. The user equipment may include a receiving unit configured to receive offset information indicating a specific offset value for an uplink SRS transmit power of the user equipment, from a transmission/reception point, wherein the specific offset value is determined using a constant step size in an entire range including a first range and a second range, the first range is a base range, and the second range includes comparatively larger values than the first range; a control unit configured to determine the uplink SRS transmit power, based on the offset value indicated by the offset information; and a transmitting unit configured to transmit the uplink SRS with the uplink SRS transmit power determined by the control unit.

DETAILED DESCRIPTION OF EMBODIMENTS

Figure 1:
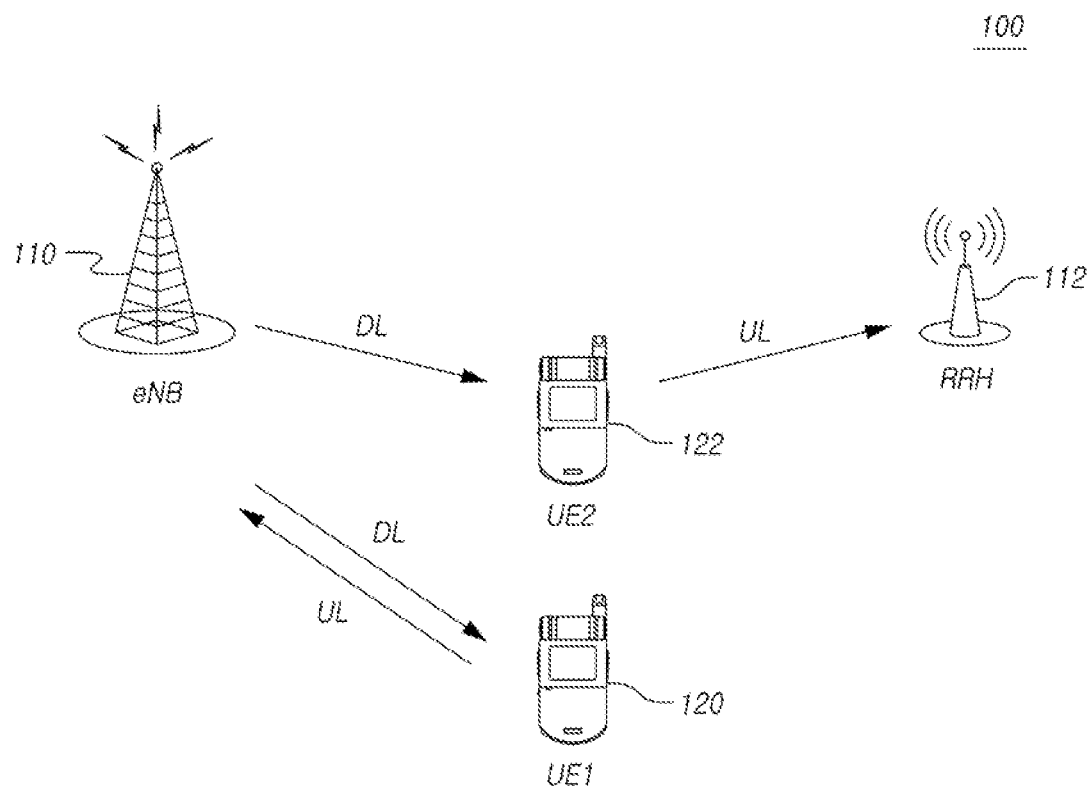
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment rather unclear.

A wireless communication system in accordance with at least one embodiment may be widely used in order to provide a variety of communication services such as a voice service, a packet data service, and so forth. The wireless communication system may include user equipment (UE) and at least one transmission/reception point. In the present description, the term "user equipment (UE)" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point generally may indicate a station communicating with the user equipment. However, the transmission/reception point may be referred to as different terms such as a base station (BS), a cell, a Node-B, an evolved Node-B (eNB), a sector, a site, a base transceiver system (BTS), an access point (AP), a relay node (RN), a remote radio head (RRH), a radio unit (RU), an antenna, and the like.

That is, in the present description, the transmission/reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In the description, the term "cell" may indicate one of coverage of a signal transmitted from a transmission point or transmission/reception point, a component carrier having the coverage, and the transmission/reception point. Herein, the term "transmission/reception point" may indicate one of a transmission point transmitting a signal, a reception point receiving a signal, and a combination thereof (i.e., a transmission/reception point).

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include a plurality of transmission/reception points 110 and 112, and at least one user equipment (UE) 120 and 122.

The transmission/reception points may be, as shown in the figure, one of eNB 110 and RRH 112. Herein, eNB 110 may be a base station or a macrocell (or macronode). RRH 112 may be at least one picocell which is wiredly controlled by coupling to eNB 110 through an optical cable or an optical fiber. Furthermore, RRH 112 may have either a high transmission power, or a low transmission power within a macrocell region. The transmission/reception points eNB 110 and RRH 112 may have the same cell identity (ID) or different cell identities.

Hereinafter, a downlink (DL) may represent communication or a communication path from transmission/reception points 110 and 112 to user equipment 120. An uplink (UL) may represent communication or a communication path from user equipment 120 to transmission/reception points 110 and 112. In the downlink, a transmitter may be a portion of transmission/reception points 110 and 112, and a receiver may be a portion of user equipment 120 and 122. In the uplink, a transmitter may be a portion of user equipment 120, and a receiver may be a portion of transmission/reception points 110 and 112.

Figure 2:
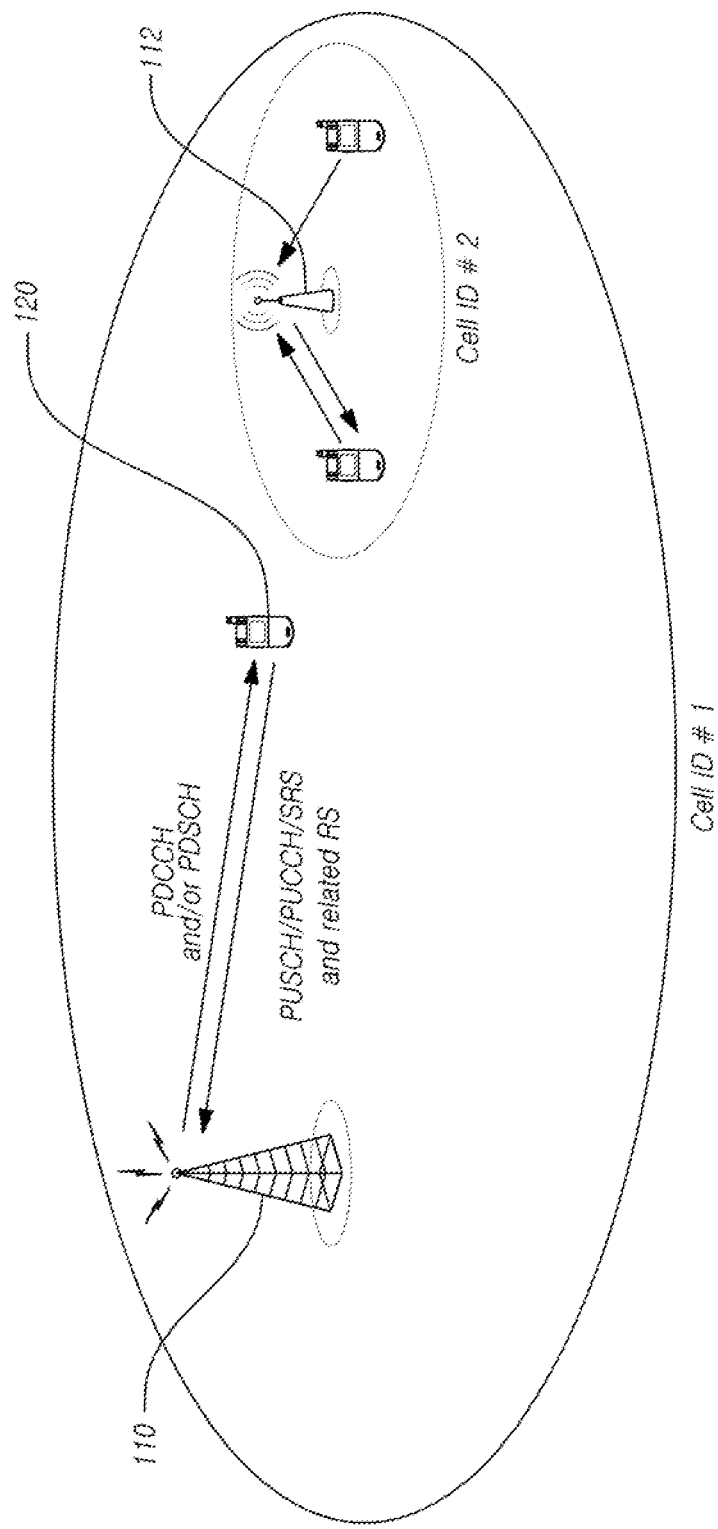
FIG. 2 and FIG. 3 illustrate transmitting/receiving uplink/downlink data to or from a transmission/reception point in user equipment.
Figure 3:
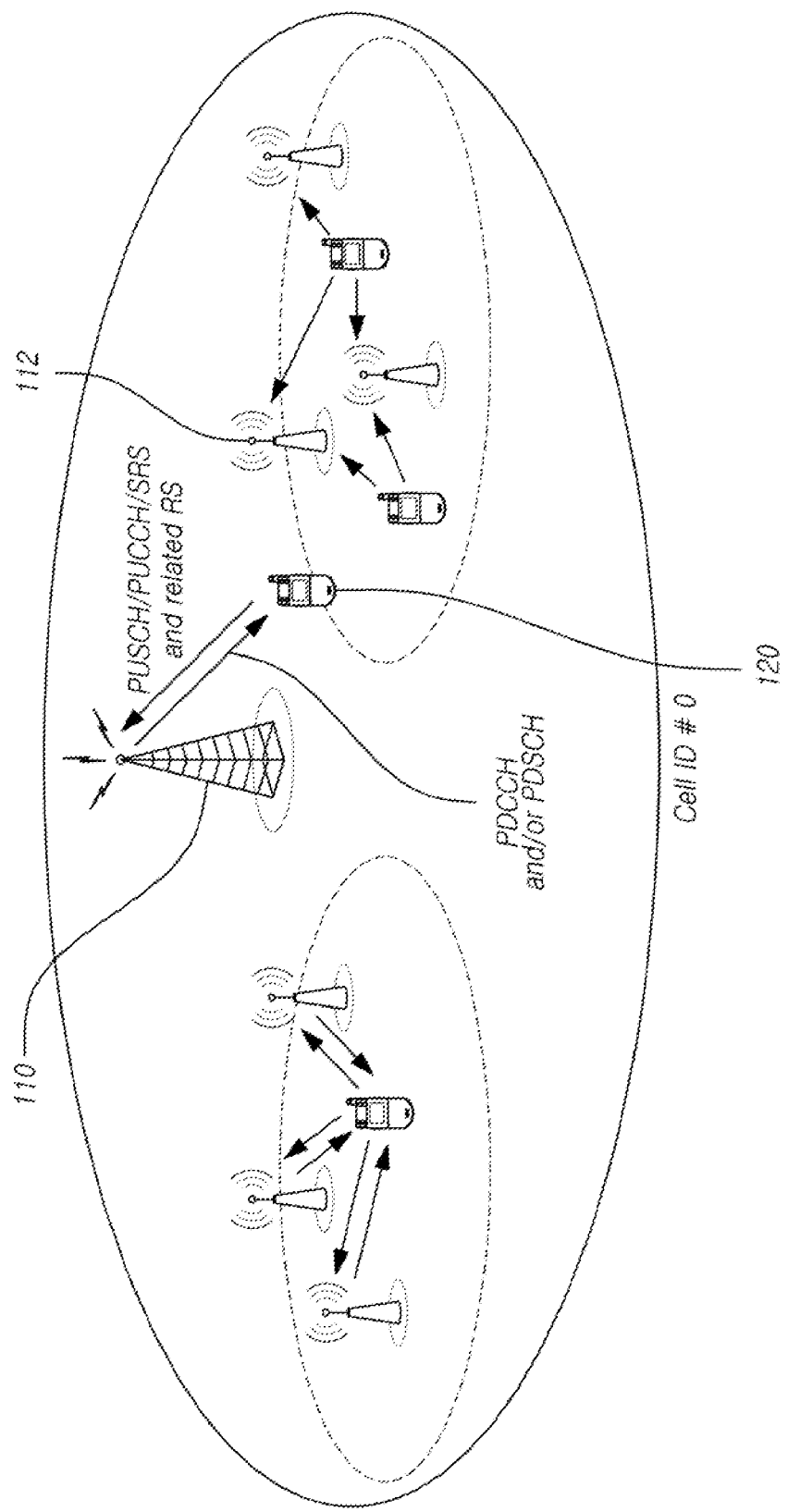

FIG. 2 and FIG. 3 illustrate transmitting/receiving uplink/downlink data to or from a transmission/reception point in user equipment.

Referring to FIG. 2 and FIG. 3, in the case that cell identities of transmission/reception points are the same or different each other, user equipment may transmit an uplink signal or receive a downlink signal in connection with the same transmission/reception point.

In a LTE or LTE-A system in conformance with a corresponding standard, an uplink and/or a downlink may be constituted based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like. In the present specification, PDCCH may be a concept including EPDCCH.

eNB 110 corresponding to one of transmission/reception points (e.g., 110 and 112) may perform a downlink transmission to user equipment 120 and 122. eNB 110 may transmit PDSCH corresponding to a primary physical channel, for unicast transmission. Furthermore, eNB 110 may transmit PDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

UE 1 (120) may transmit an uplink signal to eNB 110. UE 2 (122) may transmit an uplink signal to RRH 112 corresponding to one of transmission/reception points 110 and 112. Alternatively, UE 1 (120) may transmit an uplink signal to RRH 112, and UE 2 (122) may transmit an uplink signal to eNB 110. The number of user equipment may be "2" or more. In the following embodiments, descriptions will be given under the assumption that one of two user equipment transmits an uplink signal to eNB 110, and the other transmits an uplink signal to RRH 112, though the present embodiment is not so limited.

Hereinafter, a situation in which a signal is transmitted or received through such channels as PUCCH, PUSCH, PDCCH, and/or PDSCH may be referred to by the expression "transmit or receive PUCCH, PUSCH, PDCCH, and/or PDSCH."

In LTE communication systems corresponding to wireless communication systems, a demodulation reference signal (DMRS or DM-RS) and an SRS may be defined for an uplink. Three types of reference signals (RSs) may be defined for a downlink. Herein, the three types of the reference signals (RSs) may include a cell-specific reference signal (CRS), a multicast/broadcast over single frequency network reference signal (MBSFN-RS), and a UE-specific reference signal.

In a wireless communication system, when performing an uplink transmission, user equipment may transmit an uplink demodulation reference signal (UL DMRS or UL DM-RS) per slot such that channel information for demodulation of data channels is recognized. In the case of an uplink DM-RS associated with PUSCH, user equipment may transmit a reference signal through one symbol per slot. In the case of an uplink DM-RS associated with PUCCH, user equipment may transmit reference signals through a different number of symbols according to PUCCH formats. For example, in the case of PUCH formats 1, 1a, and 1b, a reference signal may be transmitted through three symbols per slot. In the case of PUCCH formats 2, 2a, 2b, and 3, a reference signal may be transmitted through two symbols per slot.

An uplink SRS may be used to measure an uplink channel state for an uplink frequency-dependent scheduling. The uplink SRS may also be used to measure uplink/downlink channel states such that a time division duplex (TDD) system can perform a downlink beam-forming through channel reciprocity.

In the case of an uplink SRS, a certain transmission/reception point or a certain cell in wireless communication system 100 may transmit parameters for SRS generation (i.e., parameters for generation of the SRS transmitted by user equipment) to the user equipment. Herein, the parameters for SRS generation may include a cell-specific SRS bandwidth, a transmission comb, a UE-specific SRS bandwidth, hopping related configuration parameters, a frequency domain position, a periodicity, a subframe configuration (designating which subframe will transmit an SRS), an antenna configuration (designating the number of antennas transmitting an SRS and the number of antenna ports), a base sequence index, a cyclic shift index (i.e., a reference signal to be used for SRS generation), and so forth. Herein, the transmission comb may designate frequency positions assigned at intervals of two types of subcarrier spacing. For example, a "0" may denote even subcarriers and a "1" denote odd subcarriers. The base sequence index may be an SRS sequence index for generating a corresponding SRS. The SRS sequence index may be determined, based on sequence group number u used in PUCCH and sequence number v defined according to a sequence hopping configuration. More specifically, a corresponding transmission/reception point (e.g., eNB 110) may transmit the parameters for SRS generation, as RRC parameters, to user equipment 120. User equipment 120 may receive the parameters for SRS generation from eNB 110, and transmit an uplink SRS to eNB 110.

Furthermore, an aperiodic SRS may be defined along with a periodic SRS. In the case of the aperiodic SRS, like a case of the periodic SRS, parameters to be used for generation of the aperiodic SRS may be transmitted, as RRC parameters, to user equipment 120 by a certain transmission/reception point. Herein, the parameters for generation of the aperiodic SRS may include a UE-specific SRS bandwidth of aperiodic SRS, a transmission comb, a frequency domain position, a periodicity, a subframe configuration, an antenna configuration, a base sequence index, a cyclic shift index, and so forth, as defined in wireless communication system 100.

In addition, a certain transmission/reception point may dynamically trigger user equipment 120 through PDCCH such that user equipment 120 can transmit a periodic SRS. When receiving a triggering signal through the PDCCH and RRC parameters, user equipment 120 may transmit an uplink aperiodic SRS. Hereinafter, procedures for generation and transmission of an SRS will be described in more detail.

An SRS sequence may be generated by a cyclic shift (CS) of a base sequence $\bar{r}_{u,v}(n)$ based on Zadoff-Chu sequence, as described by Formula 1 and Formula 2 below. Herein, the generated SRS sequence may have length $M_{SC}^{RS}$ based on resource blocks (RBs) used for an SRS transmission. For example, the length $M_{SC}^{RS}$ of the SRS sequence=[Number of RSs]×[Number of subcarriers (typically, 12) within an RB]/2.

$$r_{SRS}^{(\tilde{p})}(n)=r_{u,v}^{(\alpha_{\tilde{p}})}(n) \qquad \text{[Formula 1]}$$

$$r_{u,v}^{(\alpha_{\tilde{p}})}(n)=e^{j\alpha_{\tilde{p}} n}\bar{r}_{u,v}(n) \qquad \text{[Formula 2]}$$

where, $r_{u,v}^{(\alpha_{\tilde{p}})}(n)$ denotes a reference signal (RS) sequence, $\alpha_{\tilde{p}}$ denotes a cyclic shift (CS), $\bar{r}_{u,v}(n)$ denotes a base sequence, $0 \leq n < M_{SC}^{RS}$, $M_{SC}^{RS} = mN_{SC}^{RB}$, $1 \leq m \leq N_{RB}^{max,UL}$, and $M_{SC}^{RS}$ is the number of subcarriers assigned for UL RS sequence in the frequency domain.

Base sequences may be differently generated according to the sequence group number u, the base sequence number v within the group, and a sequence length n.

In a sequence group hopping, 30 sequence groups may be hopped per slot regardless of the number of resource blocks (RBs) assigned to user equipment.

More specifically, the sequence group number u in slot $n_S$ may be defined by a group hopping pattern $f_{gh}(n_S)$ and a sequence-shift pattern $f_{SS}$, according to Formula 3 below.

$$u=(f_{gh}(n_S)+f_{SS}) \bmod 30 \qquad \text{[Formula 3]}$$

The sequence group hopping pattern $f_{gh}(n_S)$ may be the same for PUCCH and PUSCH. However, the sequence-shift pattern $f_{SS}$ may be different for PUCCH and PUSCH.

The group-hopping pattern $f_{gh}(n_S)$ may be given by Formula 4 below for PUCCH and PUSCH.

$$f_{gh}(n_s) = \text{[Formula 4]}$$

$$\begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

In Formula 4, c(i) denotes a pseudo-random sequence. When user equipment 120 receives virtual cell identity $n_{ID}^{RS}$ from eNB 110, the pseudo-random sequence c(i) may be initialized using the received virtual cell identity $n_{ID}^{RS}$ in each radio frame. More specifically, the pseudo-random sequence may be initialized with $$c_{init} = \left\lfloor \frac{n_{ID}^{RS}}{30} \right\rfloor.$$

Herein, the virtual cell identity ($n_{ID}^{RS}$ or VCID) (hereinafter, referred to as $n_{ID}^{RS}$) may be the same as a physical cell identity $N_{ID}^{cell}$ of a serving transmission/reception point performing a downlink transmission to user equipment. Alternatively, the virtual cell identity (VCID) $n_{ID}^{RS}$ may be a physical cell identity of a transmission/reception point different from the serving transmission/reception point.

Definition of the sequence-shift pattern $f_{SS}$ may be different between PUCCH and PUSCH. For PUCCH, the sequence-shift pattern $f_{SS}^{PUCCH}$ may be given by $f_{SS}^{PUCCH} = n_{ID}^{RS} \bmod 30$.

Sequence hopping may be applied for reference signals of length 6 RBs or larger ($M_{SC}^{RS} \geq 6N_{SC}^{RB}$). For reference-signals of length less than 6 RBs ($M_{SC}^{RS} < 6N_{SC}^{RB}$), the base sequence number v within the base sequence group may be given by v=0.

For reference-signals of length 6 RBs or larger ($M_{SC}^{RS} \geq 6N_{SC}^{RB}$), the base sequence number V within the base sequence group in slot $n_S$ may be defined by Formula 5 below.

$$v = \begin{cases} c(n_s) & \text{if group hopping is disabled} \\ & \text{and sequence hopping is enabled} \\ 0 & \text{otherwise} \end{cases} \text{[Formula 5]}$$

In Formula 5, c(i) denotes a pseudo-random sequence. The pseudo-random sequence may be initialized with $$c_{init} = \left\lfloor \frac{n_{ID}^{RS}}{30} \right\rfloor \cdot 2^5 + f_{ss}^{PUSCH}$$

in each radio frame.

The cyclic shift $\alpha_{\tilde{p}}$ may be differently generated for each user equipment and for each antenna port, according to Formula 6 below.

$$\alpha_{\tilde{p}} = 2\pi \frac{n_{SRS}^{cs,\tilde{p}}}{8} \quad \text{[Formula 6]}$$

$$n_{SRS}^{cs,\tilde{p}} = \left(n_{SRS}^{cs} + \frac{8\tilde{p}}{N_{ap}}\right) \bmod 8$$

$$\tilde{p} \in \{0, 1, \ldots, N_{ap} - 1\}$$

In Formula 6, $n_{SRS}^{CS}$ is used to calculate the cyclic shift $\alpha_{\tilde{p}}$ and may be transmitted by higher-layer signaling (e.g., RRC). For example, in the case of $n_{SRS}^{CS}$, a total of 8 values (e.g., $n_{SRS}^{CS} = \{0, 1, 2, 3, 4, 5, 6, 7\}$) for each user equipment may be transmitted. Cyclic shift $\alpha_{\tilde{p}}$ for each antenna port may be determined based on the transmitted $n_{SRS}^{CS}$ as described in Formula 6. $\tilde{p}$ denotes an antenna port number index, and $N_{ap}$ denotes the number of antenna ports used for an SRS transmission.

Figure 4:
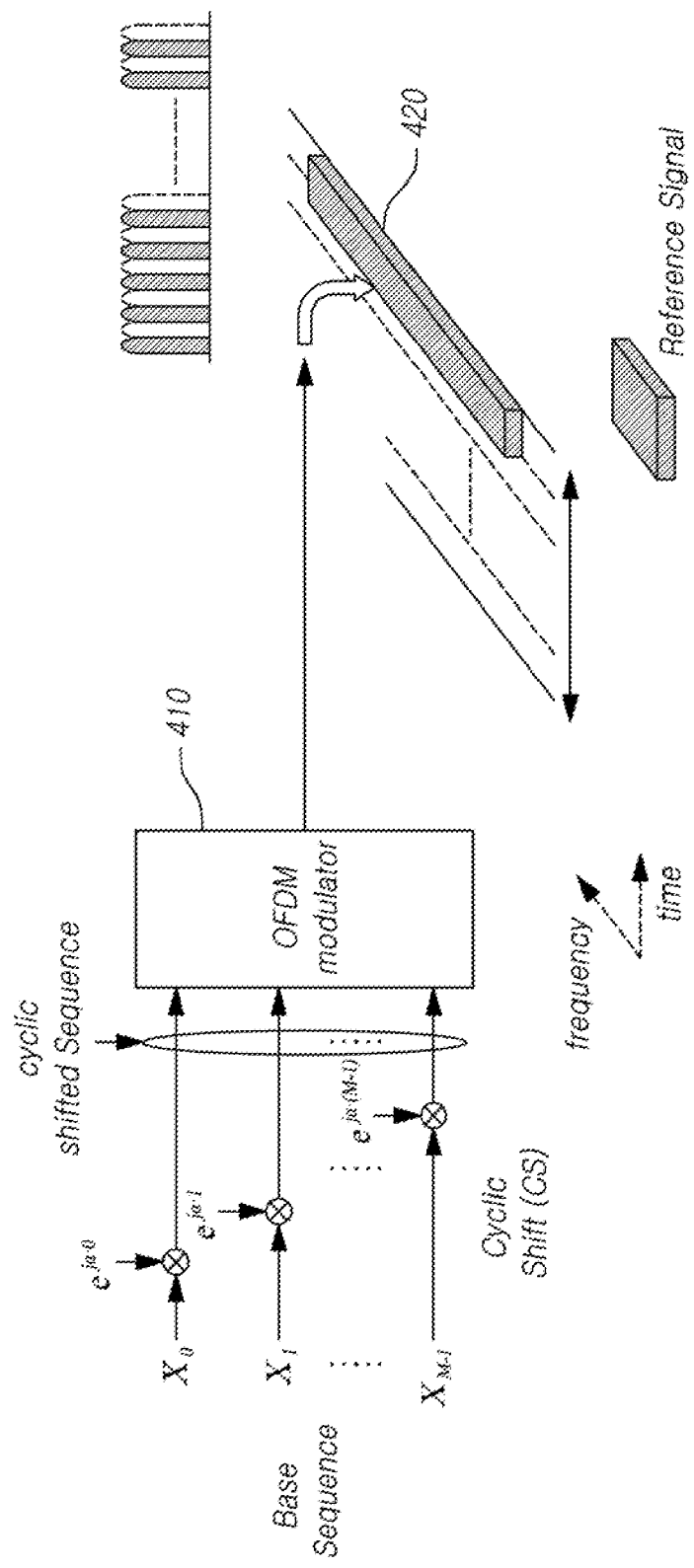
FIG. 4 is a diagram illustrating user equipment for generating a sounding reference signal (SRS)

FIG. 4 is a diagram illustrating user equipment for generating a sounding reference signal (SRS).

A SRS sequence may be generated according to Formula 1 using the base sequence of Formula 2 and the cyclic shift (CS) $\alpha_{\tilde{p}}$ of Formula 6. Such SRS sequence generation procedure may be performed in OFDM modulator 410 shown in FIG. 4. User equipment 120 may assign radio resources for an SRS transmission, and transmit the generated SRS through the assigned radio resources, to a transmission/reception point indicated by $n_{ID}^{RS}$.

As described above, $n_{ID}^{RS}$ may be the same as a physical cell identity $N_{ID}^{cell}$ of a serving transmission/reception point performing a downlink transmission to user equipment. Alternatively, $n_{ID}^{RS}$ may be a physical cell identity of a transmission/reception point different from the serving transmission/reception point. Therefore, a transmission/reception point indicated by $n_{ID}^{RS}$ may be a serving transmission/reception point (e.g., eNB 110) serving the user equipment, or a different transmission/reception point (i.e., a transmission/reception point different from the serving transmission/reception point, e.g., RRH 112). Accordingly, a variety of embodiments for determining a target receiving subject of an SRS may be present.

An SRS sequence generated by Formula 1 may be mapped to corresponding symbols of a subframe. Such mapping operation may be performed through resource element mapper 420 shown in FIG. 4.

Figure 5:
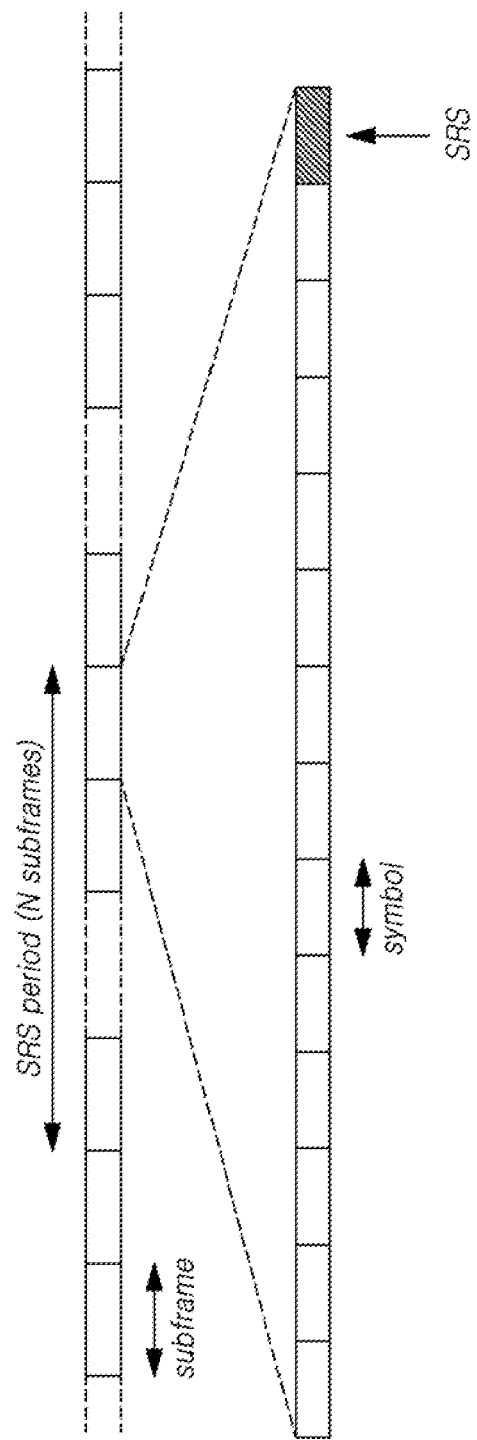
FIG. 5 illustrates a position of a symbol carrying an SRS.
Figure 6:
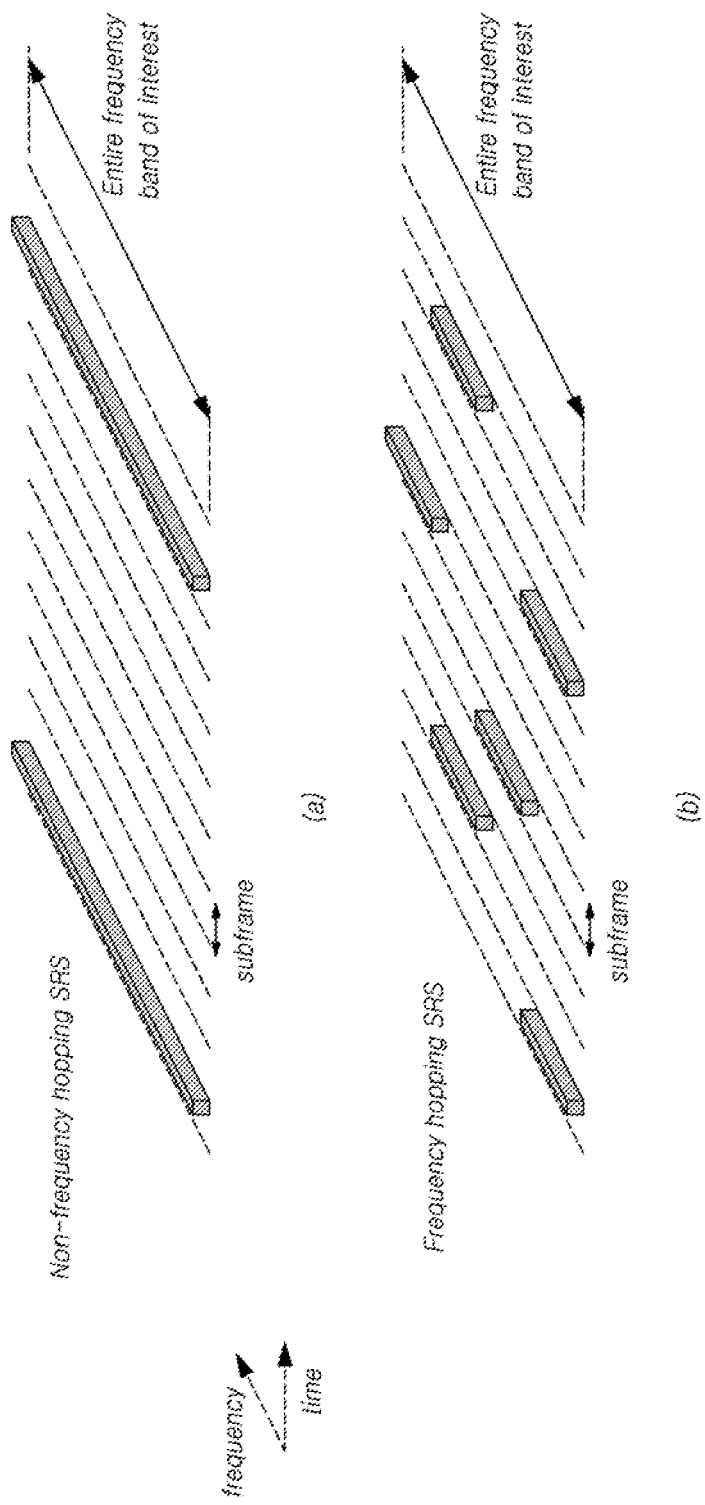
FIG. 6 illustrates a non-frequency hopping SRS and a frequency hopping SRS.

FIG. 5 illustrates a position of a symbol carrying an SRS. FIG. 6 illustrates a non-frequency hopping SRS and a frequency hopping SRS.

Referring to FIG. 5 and FIG. 6, an SRS may be transmitted by the last symbol of a subframe. In the frequency domain, SRS transmissions should cover the frequency band that is of interest for a frequency-domain scheduling. As shown in FIG. 6(a), a sufficiently wideband SRS transmission may be performed such that channel quality of an entire frequency band of interest can be estimated with a single SRS transmission. As shown in FIG. 6(b), a sequence of SRS transmissions may jointly cover the entire frequency band of interest, by transmitting a narrowband SRS using hopping in the frequency domain.

As described above, when an SRS is mapped to resource elements, SC-FDMA symbols may be generated by an SC-FDMA generator (not shown in FIG. 4). SRS signals corresponding to the generated SC-FDMA symbols may be transmitted to a corresponding transmission/reception point.

Specific subframes carrying SRSs may be periodically or aperiodically determined. For example, "cell-specific subframes for SRS transmission" (hereinafter, referred to as "cell-specific SRS subframes") may be configured or defined as shown in Table 1 or Table 2 below. Herein, Table 1 and Table 2 may be associated with frequency division duplex (FDD) and time division duplex (TDD), respectively. An SRS may be periodically transmitted in subframes which have a specific configuration period $T_{SFC}$ and a specific transmission offset $\Delta_{SFC}$ in each user equipment. Such SRS may be referred to as a periodic SRS or a trigger type 0 SRS. Alternatively, an SRS may be transmitted in subframes which are aperiodically configured. In this case, such SRS may be referred to as an aperiodic SRS or a trigger type 1 SRS.

TABLE 1

| srs-Sub-frameConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TABLE 2

| srs-Sub-frameConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

As described above, generation and transmission procedures of an SRS sequence have been described with reference to FIG. 4 to FIG. 6. Hereinafter, a method of controlling a transmit power of an uplink SRS will be described in more detail.

In a method of controlling an uplink SRS transmit power in accordance with at least one embodiment, UE transmit power $P_{SRS}$ for an uplink SRS transmitted on subframe i to a transmission/reception point c by user equipment may be defined by Formula 7 below. Herein, the transmission/reception point may be a serving transmission/reception point or a serving cell. Alternatively, the transmission/reception point may be a transmission/reception point (or a cell) different from the serving transmission/reception point (or the serving cell) as described later.

$$P_{SRS,c}(i) = \min\{P_{CMAX,c}(i), P_{SRS\_OFFSE,Tc}(m) + 10\log_{10}(M_{SRS,c}) + P_{O\_PUSCH,c}(j) + \alpha_c(j) \cdot PL_c + f_c(i)\} \text{ [dBm]} \quad \text{[Formula 7]}$$

In Formula 7, $P_{CMAX,c}(i)$ denotes a maximum transmit power of user equipment 120. A transmit power for an SRS may be restricted to $P_{CMAX,c}(i)$.

$P_{SRS\_OFFSET,c}(m)$ denotes an offset value determined by RRC signaling or by higher layers for a specific m for a serving cell c. Herein, a range of the offset value, or values of m will be described later.

$M_{SRS,c}$ denotes the bandwidth of an SRS transmission in subframe i for the serving cell c expressed in the number of resource blocks.

$P_{O\_PUSCH,c}(j)$ denotes a semi-static base level, and may include a common power level $P_{O\_NOMINAL\_PUSCH,c}(j)$ and a UE-specific power level $P_{O\_UE\_PUSH,c}(j)$.

The UE-specific power level $P_{O\_UE\_PUSCH,c}(j)$ may be defined by Formula 8 below.

$$P_{O\_PUSCH,c}(j) = P_{O\_NOMINAL\_PUSCH,c}(j) + P_{O\_UE\_PUSCH,c}(j) \quad \text{[Formula 8]}$$

In other words, $P_{O\_PUSCH,c}(j)$ is a factor of a guaranteed received power for a PUSCH transmission. $P_{O\_PUSCH,c}(j)$ represents a received power required to obtain 'reception signal-to-interference-and-noise ratio' (SINR) by a base station. $P_{O\_PUSCH,c}(j)$ is a value determined based on interference levels by the base station. Herein, interference may vary according to system implementation situations. Furthermore, the interference may vary with time since the loads within a network vary with time.

For PUSCH (re)transmissions corresponding to a semi-persistent grant, then j=0. For PUSCH (re)transmissions corresponding to a dynamic scheduled grant, then j=1. For PUSCH (re)transmissions corresponding to a random access response grant, then j=2. In this case, $P_{O\_UE\_PUSCH,c}(2)=0$ and $P_{O\_NOMINAL\_PUSCH,c}(2) = P_{O\_PRE} + \Delta_{PREAMBLE\_Msg3}$. Herein, the parameter preambleInitialReceivedTargetPower ($P_{O\_PRE}$) and $\Delta_{PREAMBLE\_Msg3}$ may be signalled by higher layers.

If a total transmit power of user equipment for an SRS symbol exceeds $\hat{P}_{CMAX}(i)$, the user equipment may satisfy the condition $$\sum_c w(i) \cdot \hat{P}_{SRS,c}(i) \leq \hat{P}_{CMAX}(i)$$

by scaling $\hat{P}_{SRS,c}(i)$ for a serving cell c in subframe i. Herein, in subframe i, $\hat{P}_{SRS,c}(i)$ is a linear value of $P_{SRS,c}(i)$ $\hat{P}_{CMAX}(i)$ is a linear value of $P_{CMAX}(i)$ and w(i) is a scaling factor of $P_{SRS,c}(i)$ for the serving cell c where $0 \leq w(i) \leq 1$.

$\alpha_c(j)$ indicates a degree of a pathloss compensation. If $a_c(j)=1$, a pathloss is completely compensated. If $a_c(j)$ is less than 1, it means that the pathloss is not completely compensated. For j=0 or 1, $\alpha_c(j) \in \{0, 0.4, 0.5, 0.6, 0.7, 0.8, 0.9, 1\}$. For j=2, $\alpha_c(j)=1$.

$PL_c$ denotes a downlink pathloss estimate calculated in user equipment 120 for the serving cell c. $PL_c$ may be determined according to the Formula $PL_c$=reference signal transmit power—reference signal received power (RSRP).

$f_c(i)$ denotes a value for directly adjusting a PUSCH transmit power through an explicit power control command. f(i) is an accumulated value, and may be increased or decreased by a specific quantity. f(i) may be included in an uplink scheduling grant.

More specifically, $f_c(i)$ may be defined by $f_c(i) = f_c(i-1) + \delta_{PUSCH,c}(i - K_{PUSCH})$. Herein, $\delta_{PUSCH,c}(i - K_{PUSCH})$ may be signaled on PDCCH with DCI format 0 or DCI format 3/3A on subframe $i - K_{PUSCH}$. If accumulation is not enabled, $f^c(i) = \delta_{PUSCH,c}(i - K_{PUSCH})$.

Unlike a typical method, a method of controlling a transmit power of an SRS in accordance with at least one embodiment may extend $P_{SRS\_OFFSET,c}(m)$ among the parameters used to determine an SRS transmit power according to Formula 7 above.

More specifically, it may be necessary that an SRS transmit power based on an offset value should be designated in a larger power range than a typical power range, and compatibility with a typical user equipment should be also possible. Accordingly, $P_{SRS\_OFFSET,c}(m)$ may be determined such that an SRS transmit power value can be designated in an entire range including a first range and a second range. Herein, the first range may represent a power range that can be designated by a typical offset value. The second range may represent a range that allows for designation of power values in a larger range than the first range.

In addition, unlike a typical method, a method of controlling a transmit power of an SRS in accordance with at least one embodiment may differently determine the parameter "pathloss" $PL_c$ among the parameters used to determine an SRS transmit power according to Formula 7 above.

More specifically, in Formula 7, $PL_c$ corresponding to a pathloss estimate may represent a pathloss value estimated using "channel-state information-reference symbol" (CSI-RS). Alternatively, $PL_c$ may represent a pathloss estimated using a cell-specific RS (CRS) and CSI-RS used in a downlink.

As described above, a method of controlling a transmit power of an SRS in accordance with at least one embodiment may be applied to a case that the SRS is transmitted to a serving transmission/reception point (e.g., eNB 110). Herein, the serving transmission/reception point (e.g., eNB 110) may perform a downlink transmission to user equipment 120. Furthermore, the transmit power control method may be applied to a case that the SRS is transmitted to a transmission/reception point (e.g., RRH 112) different from the serving transmission/reception point (e.g., eNB 110). Alternatively, the transmit power control method may be applied to only one of the above-described two cases.

Accordingly, before describing an SRS transmit power control method according to at least one embodiment in detail, environments where a receiving subject of an SRS is different from a serving transmission/reception point will be described.

A typical transmission/reception point may be one physical system including a digital signal processing unit ("DU") and a radio signal processing unit ("RU"). However, in this case, there may be a limitation to optimization of a cell design since a transmission/reception point including the digital/radio signal processing units (DU and RU) should be deployed in a cell.

In order to overcome the above-mentioned limitation, in wireless communication system 100 to which at least one embodiment may be applied, functions of a transmission/reception point may be separated and concentrated according to a newly-suggested "cloud communication center" (CCC). For example, a digital signal processing unit ("DU") and a radio signal processing unit ("RU") of a transmission/reception point are separated, the DU may be concentrically deployed in a telephone station such as eNB, and the RU may be deployed in a service area such as RRH. Herein, the RU may transmit and/or receive radio signals.

In an above-described environment, user equipment may be located in coverage areas of a plurality of RUs, move between coverage areas of a plurality of RUs, or receive a service from an RU on a cell-edge of a plurality of RUs. That is, while the user equipment is located or moves, a coverage area of a downlink transmission signal transmitted by an RU may become different from a coverage area of an uplink transmission signal transmitted to an RU by the user equipment. In other words, an uplink geometry and a downlink geometry associated with the user equipment may differ. Furthermore, in the case that user equipment receives a data channel and a control channel through a downlink from a specific RU, the user equipment may perform an uplink transmission to a different RU.

Even in a heterogeneous network environment considering a macro cell deployment and a variety of small cell deployments, similar situations or cases to the above-described situations or cases may be present. In other words, coverage areas of a macro cell and a small cell may differ from each other. Furthermore, in the case that user equipment received a downlink data channel and/or a downlink control channel from the macro cell, the user equipment may transmit an uplink data and/or an uplink control information to a small cell coverage area having a comparatively better geometry for an uplink. Accordingly, in the case of a downlink, improvement of a downlink data transmission speed may be possible by increasing reliability of uplink control information. Meanwhile, in the case of an uplink, improvement of an uplink data transmission speed may be possible by increasing the reliabilities of control information and an uplink data transmission.

As described above, in a wireless communication system to which at least one embodiment is applied, a virtual cell identity $n_{ID}^{RS}$ for an SRS sequence generation may be the same as a physical cell identity $N_{ID}^{cell}$ of a serving transmission/reception point performing a downlink transmission to user equipment. Alternatively, the virtual cell identity $n_{ID}^{RS}$ may be a physical cell identity of a transmission/reception point (e.g., RRH 112) different from the serving transmission/reception point. Accordingly, a receiving subject of an SRS may be designated as a serving transmission/reception point (e.g., eNB 110). Furthermore, the receiving subject of the SRS may be designated as a different transmission/reception point such as RRH 112, according to a channel state.

Hereinafter, in a wireless communication system to which at least one embodiment is applied, some embodiments transmitting an SRS will be described with reference to figures.

Figure 7:
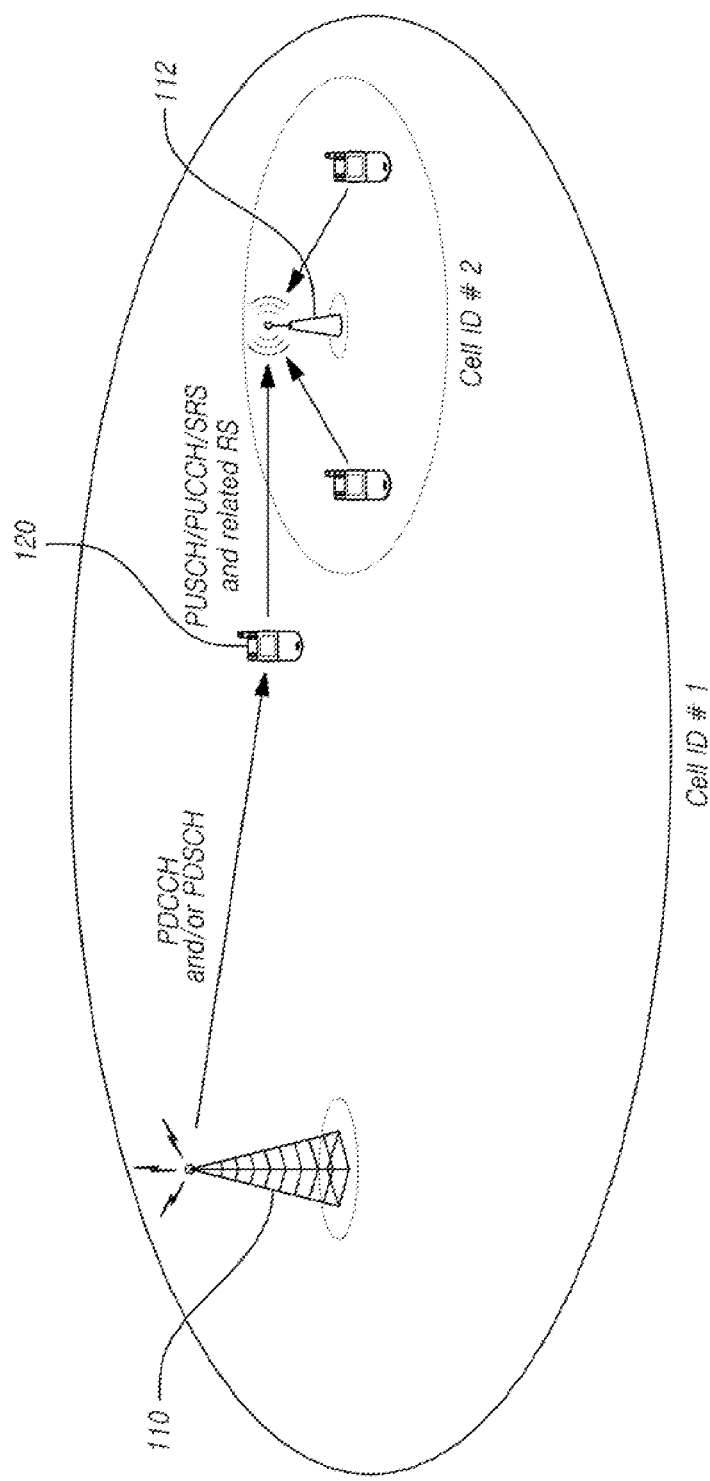
FIG. 7 and FIG. 8 illustrate transmitting an uplink channel to a transmission/reception point other than a serving transmission/reception point.
Figure 8:
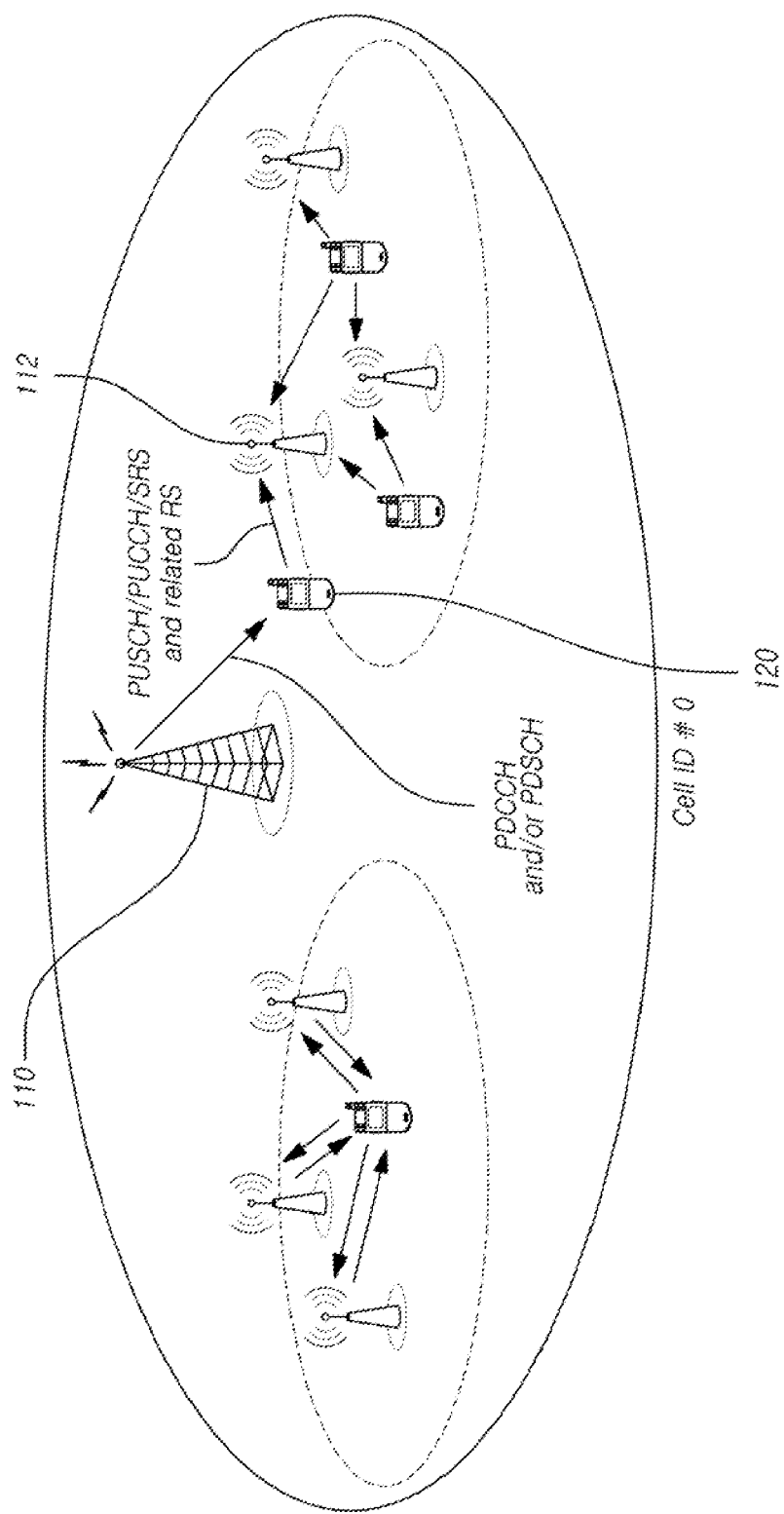

FIG. 7 and FIG. 8 illustrate transmitting all uplink related channels to a transmission/reception point different from a serving transmission/reception point.

Referring to FIG. 7 and FIG. 8, in the case that cell identities of transmission/reception points are the same or different from each other, a downlink control channel and a downlink data channel may be received from a transmission/reception point (e.g., eNB 110) to which corresponding user equipment 120 belongs. In this case, all uplink related channels may be transmitted to a transmission/reception point (e.g., RRH 112) having a comparatively better geometry and/or a comparatively better channel quality.

Figure 9:
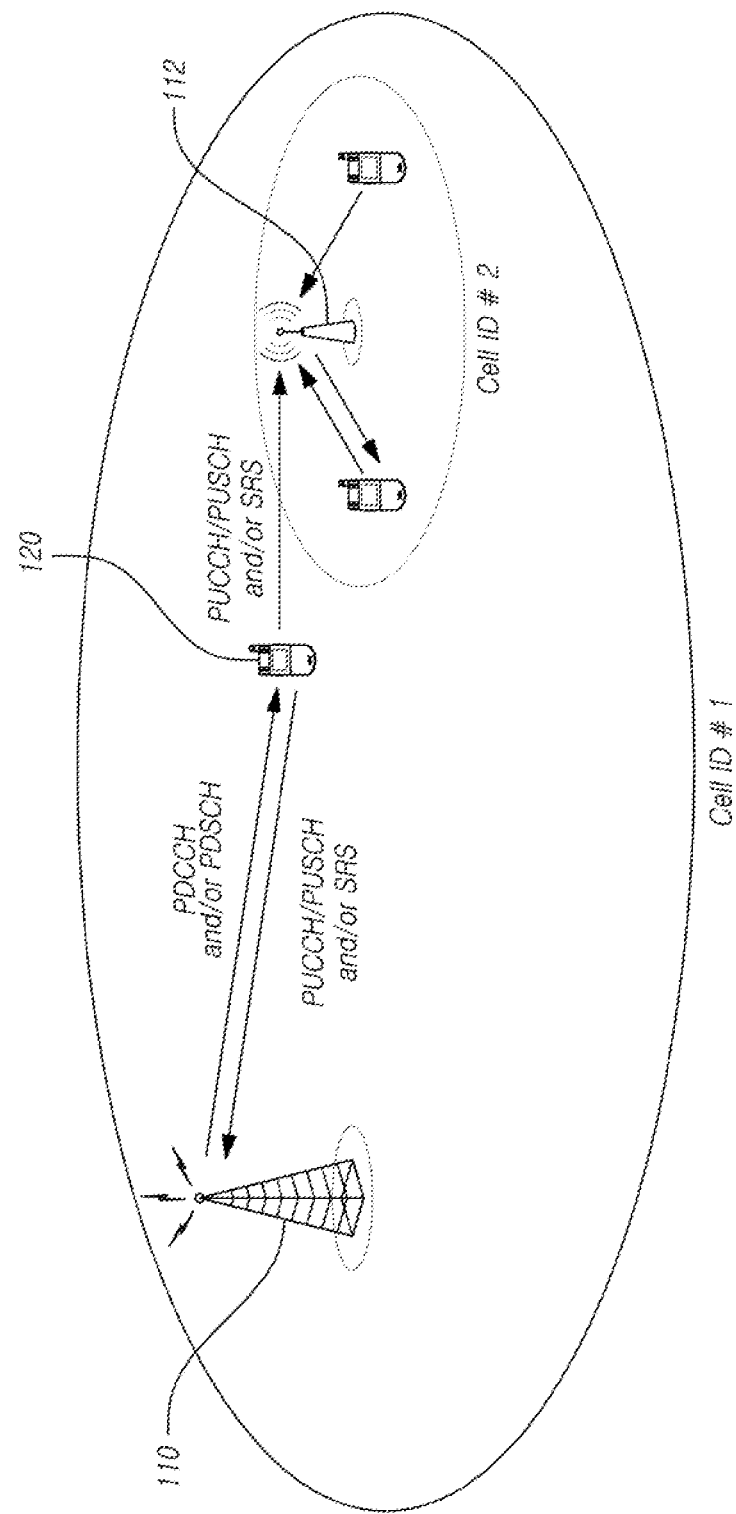
FIG. 9 and FIG. 10 illustrate transmitting a portion of uplink related channels to a transmission/reception point other than a serving transmission/reception point.
Figure 10:
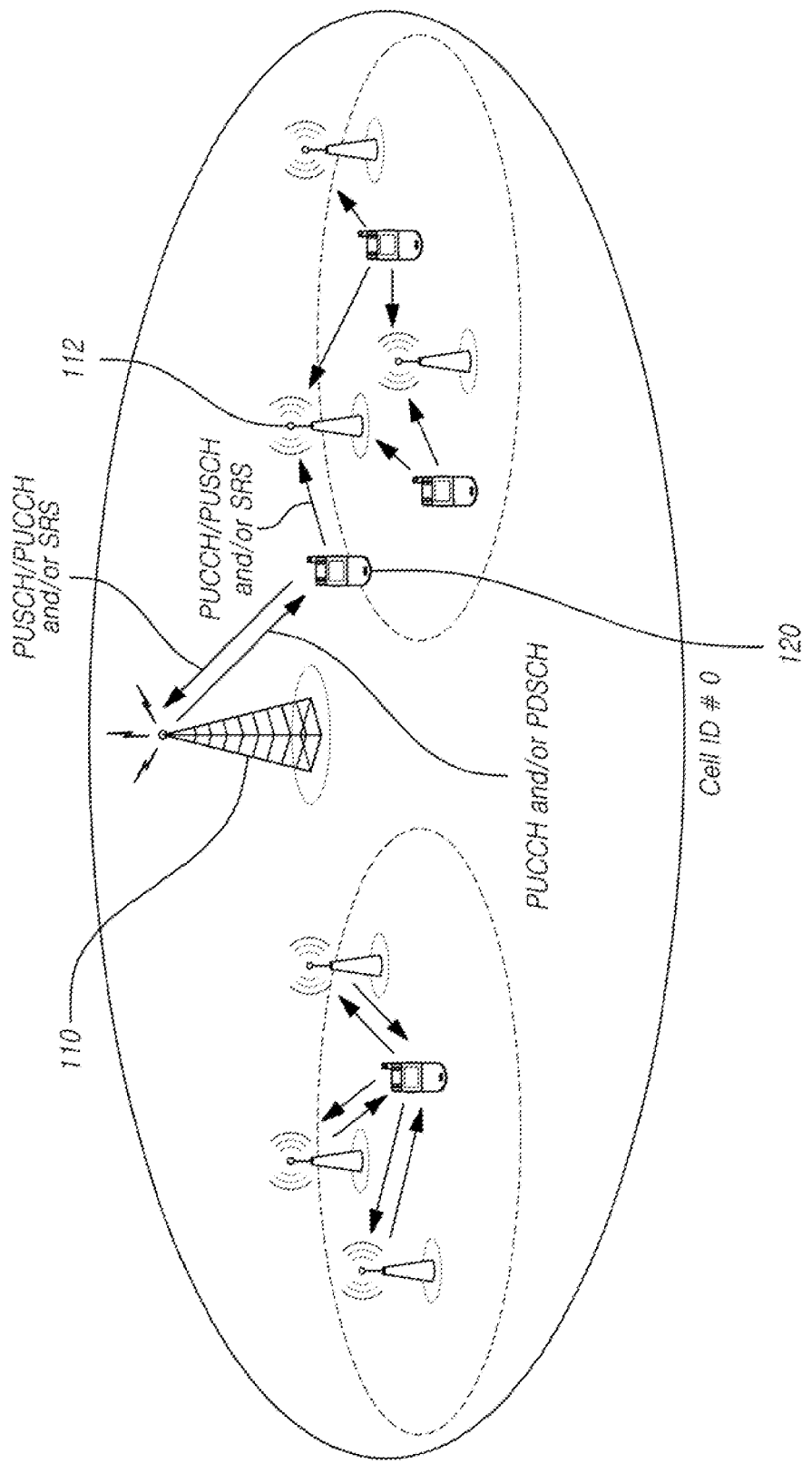

FIG. 9 and FIG. 10 illustrate transmitting a portion of uplink related channels to a transmission/reception point other than a serving transmission/reception point.

Referring to FIG. 9 and FIG. 10, in the case that cell identities of transmission/reception points are the same or different from each other, a downlink control channel and a downlink data channel may be received from a transmission/reception point (e.g., eNB 110) to which corresponding user equipment 120 belongs. In this case, PUCCH and PUSCH among uplink related channels may be transmitted to either corresponding transmission/reception point (e.g., eNB 110) or a different transmission/reception point (e.g., RRH 112). Herein, the PUCCH may transmit ACK/NACK corresponding to a response to a downlink transmission. The PUSCH may correspond to an uplink data channel. Meanwhile, an SRS may be transmitted to a serving transmission/reception point (e.g., eNB 110) to which user equipment 120 belongs. Alternatively, the SRS may be transmitted to a different transmission/reception point (e.g., RRH 112) to which user equipment 120 does not belong.

Figure 11:
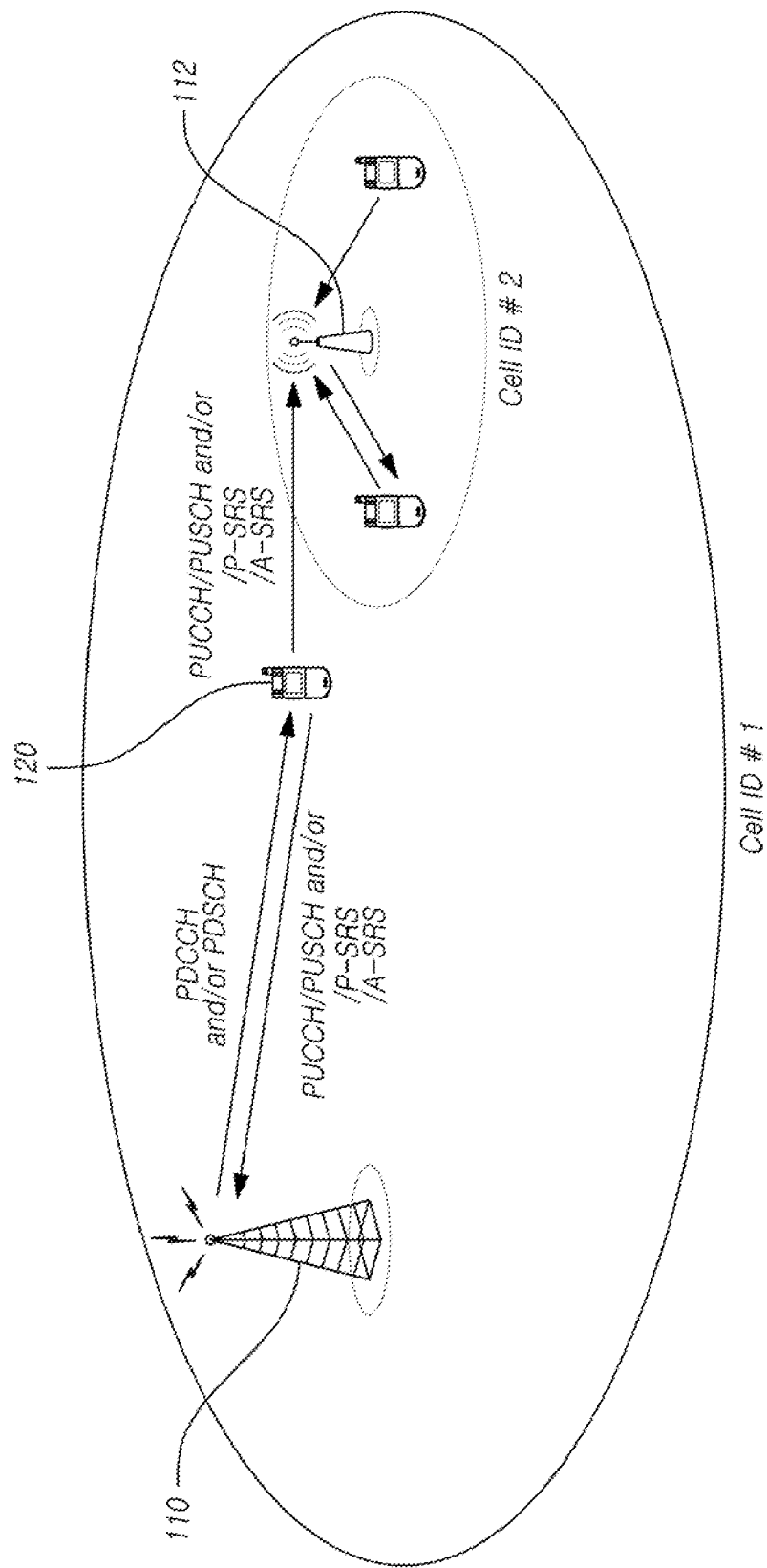
FIG. 11 and FIG. 12 illustrate transmitting a portion of uplink related channels to a transmission/reception point other than a serving transmission/reception point.
Figure 12:
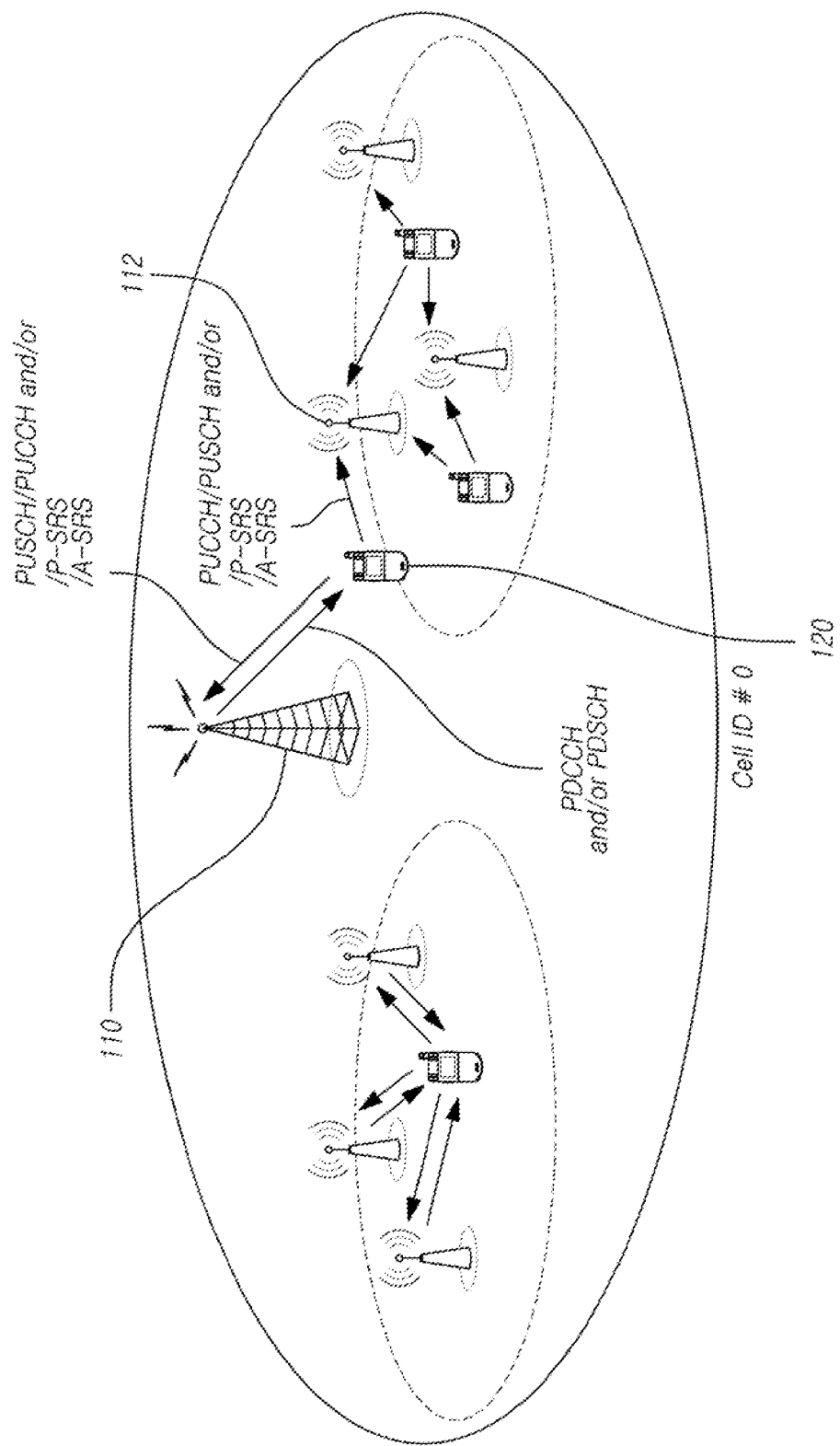

FIG. 11 and FIG. 12 illustrate transmitting a portion of uplink related channels to a transmission/reception point other than a serving transmission/reception point.

Referring to FIG. 11 and FIG. 12, a downlink control channel and a downlink data channel may be received from a transmission/reception point (e.g., eNB 110) to which corresponding user equipment 120 belongs. In this case, PUCCH and PUSCH among uplink related channels may be transmitted to either a corresponding transmission/reception point (e.g., eNB 110) or a different transmission/reception point (e.g., RRH 112). Herein, the PUCCH may transmit ACK/NACK corresponding to a response to a downlink transmission. The PUSCH may correspond to an uplink data channel. Meanwhile, in the case of an SRS, each of a periodic SRS (P-SRS) and an aperiodic SRS (A-SRS) may be independently transmitted to one of a serving transmission/reception point (e.g., eNB 110) and a different transmission/reception point (e.g., RRH 112). Herein, the serving transmission/reception point (e.g., eNB 110) may be a transmission/reception point to which user equipment 120 belongs. The different transmission/reception point (e.g., RRH 112) may be a transmission/reception point to which user equipment 120 does not belong.

Figure 13:
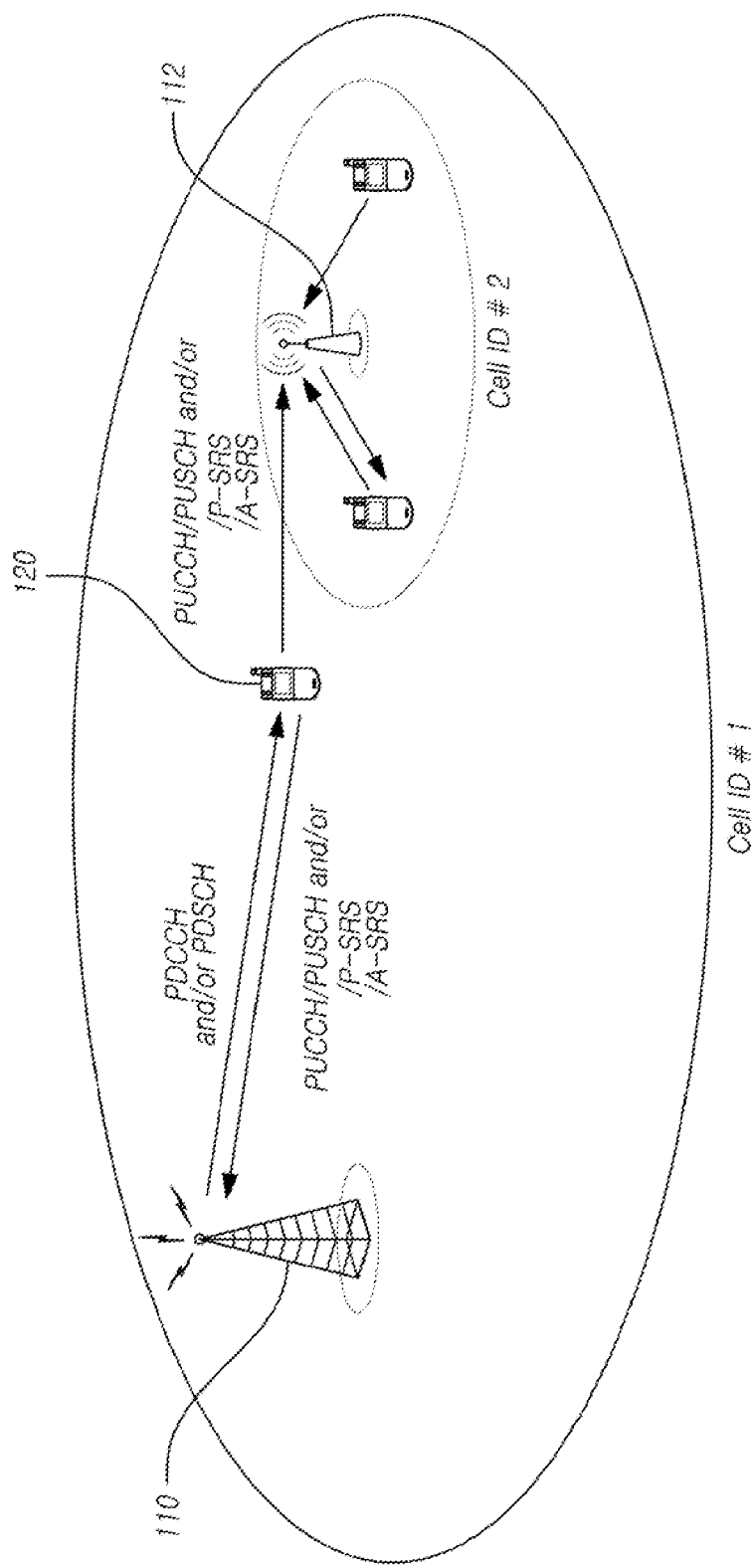
FIG. 13 and FIG. 14 illustrate transmitting a portion of uplink related channels to a transmission/reception point other than a serving transmission/reception point.
Figure 14:
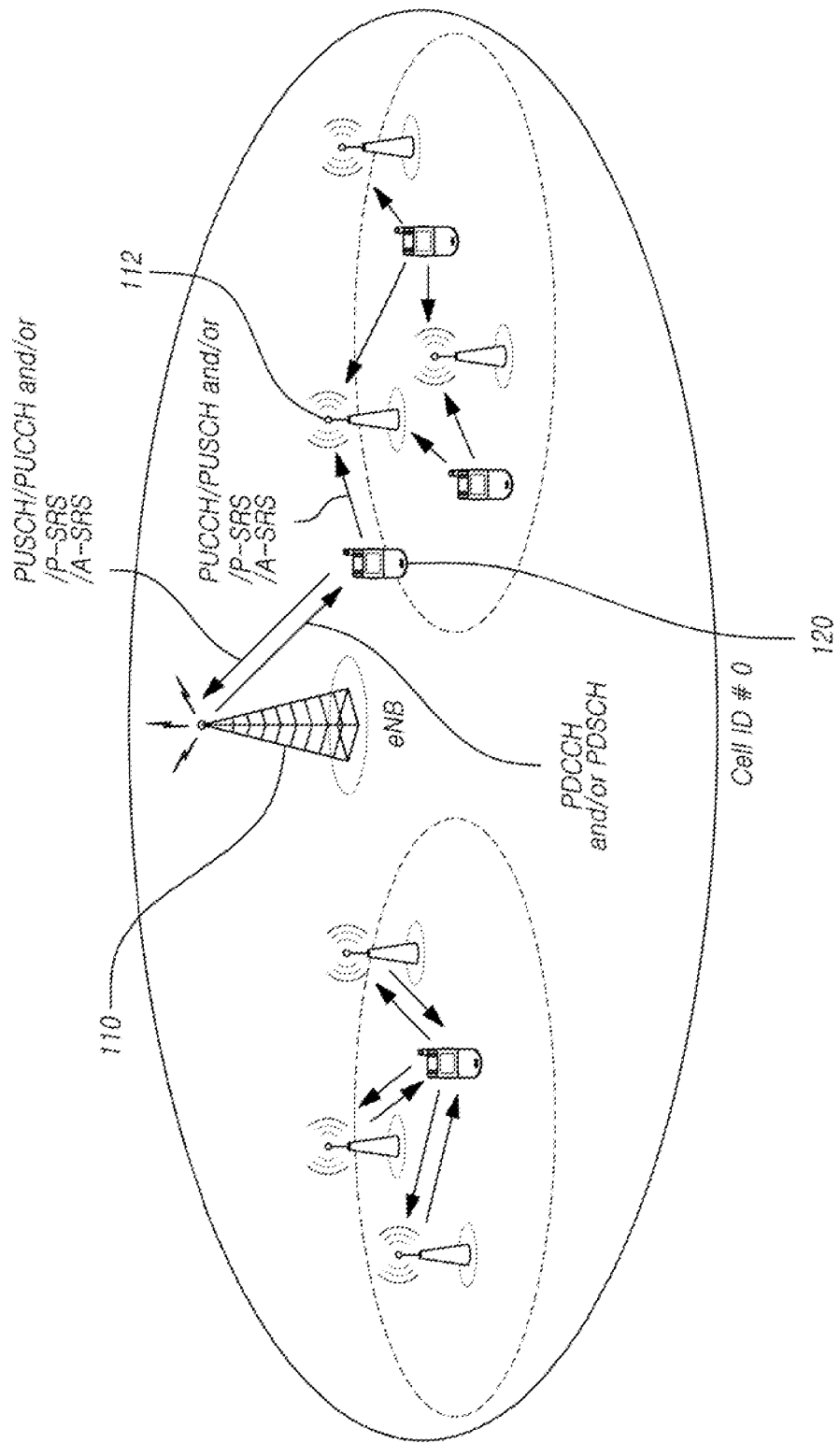

FIG. 13 and FIG. 14 illustrate transmitting a portion of uplink related channels to a transmission/reception point other than a serving transmission/reception point.

Referring to FIG. 13 and FIG. 14, a downlink control channel and a downlink data channel may be received from a transmission/reception point (e.g., eNB 110) to which corresponding user equipment 120 belongs. In this case, PUCCH and PUSCH among uplink related channels may be transmitted to either corresponding transmission/reception point (e.g., eNB 110) or a different transmission/reception point (e.g., RRH 112). Herein, the PUCCH may transmit ACK/NACK corresponding to a response to a downlink transmission. The PUSCH may correspond to an uplink data channel. Meanwhile, in the case of an SRS, a periodic SRS (P-SRS) may be transmitted to the same receiving subject as receiving subjects of the PUCCH and the PUSCH. An aperiodic SRS (A-SRS) may be independently transmitted to either a serving transmission/reception point (e.g., eNB 110) or a different transmission/reception point (e.g., RRH 112). Herein, the serving transmission/reception point (e.g., eNB 110) may be a transmission/reception point to which user equipment 120 belongs. The different transmission/reception point (e.g., RRH 112) may be a transmission/reception point to which user equipment 120 does not belong.

As described above, user equipment may perform transmission/reception operations for uplink data/control channels and/or downlink data/control channels, in connection with one transmission/reception point. Alternatively, unlike a typical system, in the case of user equipment, transmission/reception targets of an uplink and a downlink may differ. That is, the transmission/reception targets for uplink data/control channels and downlink data/control channels may differ. In the case that the transmission/reception targets of an uplink and a downlink are the same or different as described above, the present embodiment may provide a method and an apparatus for controlling a transmit power of an uplink signal.

Accordingly, like a typical system, the present embodiment may be applied to the case that transmission/reception targets of an uplink and a downlink associated with specific user equipment are the same. That is, the present embodiment may be applied to the case that the user equipment performs transmission/reception operations for uplink data/control channels and downlink data/control channels, in connection with one identical base station or one identical RU. Alternatively, unlike the typical system, the present embodiment may be applied to the case that transmission/reception targets of an uplink and a downlink associated with the user equipment differs. More specifically, in each of the above-described cases, the present embodiment may provide a method and an apparatus capable of supporting a lossless and seamless transmission of signals by properly controlling a transmit power of an uplink signal, especially an SRS.

As described above, in a method of controlling a transmit power of an uplink SRS according to the present embodiment, offset values for designation of the transmit power may be determined such that power values can be designated in an extended power control range including an existing (or typical) power control range, in order to provide compatibility with an existing user equipment. Herein, the existing user equipment may represent user equipment to which the present embodiment is not applied. Hereinafter, the existing user equipment may be referred to as "typical user equipment".

Figure 15:
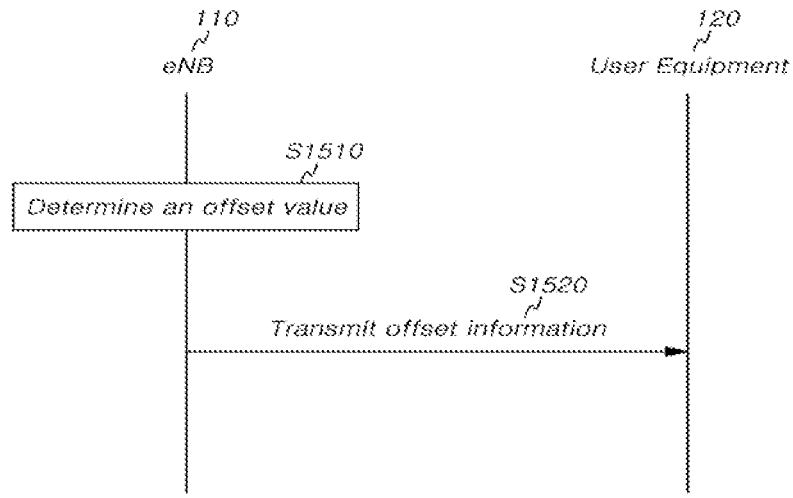
FIG. 15 is a flowchart illustrating a method of controlling a transmit power of an uplink sounding reference signal in a transmission/reception point in accordance with at least one embodiment.

FIG. 15 is a flowchart illustrating a method of controlling a transmit power of an uplink sounding reference signal in a transmission/reception point in accordance with at least one embodiment.

Referring to FIG. 15, at step S1510 in an SRS transmit power control method performed by a transmission/reception point (e.g., eNB 110), the transmission/reception point (e.g., eNB 110) may determine an offset value for an uplink SRS transmit power of user equipment 120 such that a controllable range of an SRS transmit power can be extended. At step S1520, the transmission/reception point (e.g., eNB 110) may transmit offset information indicating the determined offset value to user equipment 120 through higher-layer signaling such as an RRC signaling. At step S1520, user equipment 120 may receive the offset information.

At least one method of increasing a controllable range of an SRS transmit power may extend a possible range of offset values (i.e., $P_{SRS\_OFFSET,c}(m)$, where m={0,1}) for an uplink SRS transmit power, among parameters used for an SRS transmit power control.

At step S1510, a transmission/reception point (e.g., eNB 110) may determine a specific offset value for an uplink SRS transmit power of user equipment, using a constant step size, in an entire range including a first range and a second range. Herein, the first range may be a typical range or an existing range (hereinafter, referred to as "a typical range" or "a base range"). The second range includes comparatively larger values than the first range. The specific offset value for the uplink SRS transmit power may mean $P_{SRS\_OFFSET,c}(m)$ (where, m={0,1}) described in Formula 7.

In other words, in the cases of m=0 and m=1, the specific offset value for the uplink SRS transmit power may be determined such that an SRS power control can be performed in association with a PUSCH power control. Furthermore, in these cases, a range of corresponding offset value, i.e., $P_{SRS\_OFFSET,c}(m)$ may be extended. Accordingly, a transmission/reception point may indicate the offset value such that an SRS transmit power can be determined in the range extended to conform to each intended operation of user equipment.

The present embodiment may extend an offset value range. For example, the offset value range according to the present embodiment may include a range in which a new user equipment can operate identically to an existing user equipment, as a first range. Herein, the first range may be an available range of $P_{SRAS\_OFFSETA,c}(m)$, where m={0,1}. The new user equipment represents user equipment to which the present embodiment is applied. Therefore, backward compatibility with the existing user equipment and an existing network (hereinafter, may be referred to as a typical network) may be possible. Furthermore, the offset value range according to the present embodiment may include an extended range as a second range, in addition to the first range. Accordingly, the present embodiment may determine an offset value, in an entire range of $P_{SRS\_OFFSET,c}(m)$ (where m={0,1}) including the first range and the second range. Furthermore, the same step sizes may be sustained in the entire range such that compatibility with the existing user equipment may be possible.

For example, in the case that the parameter Ks defined by higher-layer signaling of a transmission/reception point is about 1.25 (i.e., Ks=1.25), the entire range of a transmit power indicated by $P_{SRS\_OFFSET,c}(m)$ (where, m={0,1}) may be about [−3, 28] dB. Herein, the first range may be about [−3, 12] dB, the second range may be about (12, 28] dB, and a step size may be about 1 dB. Offset values included in the second range may be about 13, 14, 15, . . . , and 28 dB since the second range does not include an offset value corresponding to about 12 dB. Meanwhile, in the case that the parameter Ks=0, the entire range may be about [−10.5, 28.5] dB, the first range may be about [−10.5, 12] dB, the second range may be about (12, 28.5] dB, and the step size may be about 1.5 dB. In this case, offset values included in the second range may be about 13.5, 15, 16.5, . . . , and 28.5 dB since the second range does not include about 12 dB corresponding to a boundary value.

Accordingly, when Ks=1.25, a range of $P_{SRS\_OFFSET,c}(m)$ (where, m={0,1}) to be indicated for the new user equipment may be extended such that a step size is about 1 dB and the range [−3, 12] dB is included. Meanwhile, when Ks=0, a range of $P_{SRS\_OFFSET,c}(m)$ (where, m={0,1}) to be indicated for the new user equipment may be extended such that a step size is about 1.5 dB and the range [−10.5, 12] dB is included.

In the case that a new user equipment is operated in a new network described with reference to FIG. 7 to FIG. 14, the above-described method according to the present embodiment may be applied to the new user equipment. Even in the case that the new user equipment is operated in an existing network described with reference to FIG. 2 and FIG. 3, power offset values for the new user equipment may be determined such that the new user equipment can be operated identically to an existing user equipment. Herein, the existing user equipment represents user equipment to which the present embodiment is not applied. Furthermore, in the case that the existing user equipment is operated in the new network, power offset values for the existing user equipment may be determined to be the same as power offset values indicated by the existing network. Accordingly, backward compatibility with the existing user equipment may be possible.

More specifically, in the case that the new user equipment (i.e., user equipment to which the present embodiment is applied) is operated in a new network described with reference to FIG. 7 to FIG. 14, a transmission/reception point may determine an offset value for an SRS transmit power of each user equipment, using a constant step size in an entire range including the first range and the second range. Meanwhile, in the case that the new user equipment is operated in an existing network described with reference to FIG. 2 and FIG. 3, a transmission/reception point may determine an offset value for an SRS transmit power of each user equipment, using a constant step size in the first range. Furthermore, in the case that the existing user equipment (i.e., user equipment to which the present embodiment is not applied) is operated in the new network, a transmission/reception point may determine an offset value for an SRS transmit power of each user equipment, as the same offset value as a corresponding offset value indicated by the existing network. That is, the transmission/reception point may determine the offset value for the SRS transmit power of the each user equipment, using a constant step size in the first range.

As described above, an SRS may include at least one of a periodic SRS and an aperiodic SRS. Accordingly, when determining offset information (S1510), a transmission/reception point (e.g., eNB 110) may independently determine offset values for the periodic SRS and the aperiodic SRS, if necessary. That is, the offset values may be differently determined according to "m" values (m=0, 1) of $P_{SRS\_OFFSET,c}(m)$.

In other embodiments, a method of increasing a controllable range of an SRS transmit power may increase the number of m in the offset value $P_{SRS\_OFFSET,c}(m)$ for an uplink SRS transmit power, among parameters used for an SRS transmit power control.

At step S1510, in order to increase the number of m in $P_{SRS\_OFFSET,c}(m)$, a transmission/reception point may determine as m≥2 as well as m=0 and m=1 in $P_{SRS\_OFFSET,c}(m)$.

In other words, like a typical or existing method, a transmission/reception point according to the present embodiment may determine the power offset parameter $P_{SRS\_OFFSET,c}(m)$ such that the cases of m=0 and m=1 can be used for power control of a periodic SRS and an aperiodic SRS. More specifically, in the case of m=0, $P_{SRS\_OFFSET,c}(0)$ may be used as a power offset parameter for power control of the periodic SRS. In the case of m=1, $P_{SRAS\_OFFSET,c}(1)$ may be used as a power offset parameter for power control of the aperiodic SRS. Furthermore, in the additional case of m≥2 (e.g., m=2, 3, or 4), power control for the periodic SRS or the aperiodic SRS may be configured to release an association relation with a PUSCH power control. In this case, a specific power offset parameter $P_{SRS\_OFFSET,c}(m)$ (where, m≥2) for a specific user equipment may be determined in a possible range of $P_{SRS\_OFFSET,c}(m)$ according to a corresponding "m" value.

In still another method of increasing a controllable range of an SRS transmit power, a transmission/reception point may increase (i) the number of m in the offset value $P_{SRS\_OFFSET,c}(m)$ for an uplink SRS transmit power, and (ii) a range of transmit power that can be defined by the offset value, among parameters used for an SRS transmit power control.

In other words, in the cases of m=0 and m=1, an offset value for an uplink SRS transmit power may be determined such that an SRS power control can be performed in association with a PUSCH power control. Furthermore, in these cases, a range of corresponding $P_{SRS\_OFFSET,c}(m)$ may be extended. Accordingly, a transmission/reception point may determine the offset value, to conform to each intended operation of user equipment. Meanwhile, like a typical or existing method, a transmission/reception point according to the present embodiment may determine the power offset parameter $P_{SRS\_OFFSET,c}(m)$ such that the cases of m=0 and m=1 can be used for power control of a periodic SRS and an aperiodic SRS. More specifically, in the case of m=0, $P_{SRS\_OFFSET,c}(0)$ may be used as a power offset parameter for power control of the periodic SRS. In the case of m=1, $P_{SRS\_OFFSET,c}(1)$ may be used as a power offset parameter for power control of the aperiodic SRS. Furthermore, in the additional case of m≥2 (e.g., m=2, 3, or 4), power control for the periodic SRS or the aperiodic SRS may be configured to release an association relation with a PUSCH power control. In this case, a specific power offset parameter $P_{SRS\_OFFSET,c}(m)$ (where, m≥2) for a specific user equipment may be determined in a possible range of $P_{SRS\_OFFSET,c}(m)$ according to a corresponding "m" value.

Herein, in the case of an SRS, the additional case of m≥2 may not be considered for the periodic SRS, and may be used for a power control configuration of the aperiodic SRS. Alternatively, the additional case of m≥2 may not be considered for the aperiodic SRS, and may be used for a power control configuration of the periodic SRS.

At step S1520, the transmission/reception point (e.g., eNB 110) may transmit offset information indicating the determined offset value to user equipment 120 through time-frequency resources.

The transmission/reception point (e.g., eNB 110) may transmit the offset information to user equipment 120 through higher-layer signaling such as RRC messages.

Herein, the offset information may include a first parameter defining a first range using a constant step size, and a second parameter defining a second range using the constant step size. When Ks=1.25, the first parameter may define the first range corresponding to about [−3, 12] dB, using about 1 dB step size. When Ks=0, the first parameter may define the first range corresponding to about [−10.5, 12] dB, using about 1.5 dB step size. Accordingly, the first parameter may have a total of 4 bits (e.g., 0000 to 1111). When Ks=1.25, the second parameter may define the second range corresponding to about (12, 28] dB, using about 1 dB step size. When Ks=0, the second parameter may define the second range corresponding to about (12, 28.5] dB, using about 1.5 dB step size. Herein, the second parameter may be a 5-bit parameter (e.g., 00000 to 11111) such that an entire range including the first and the second ranges can be defined. However, in order to define the second range, the second parameter may use only the values "10000 to 11111" corresponding to the second range, among 5-bit values.

A transmission/reception point may transmit offset information including only the first parameter, to an existing user equipment or user equipment being operated in an existing network. Furthermore, the transmission/reception point may transmit offset information including at least one of the first parameter and the second parameter, to a new user equipment or user equipment being operated in a new network.

A transmission/reception point (e.g., eNB 110) may transmit offset information including the first parameter and the second parameter, to user equipment 120.

At step S1510, in the case that m in $P_{SRS\_OFFSET,c}(m)$ is determined to be m=0, m=1, or m≥2, a transmission/reception point may include information indicating "m" values, in the offset information. For example, when m=0, 1, 2, 3, 4, or 5, the offset information may include a specific bit (e.g., 3 bits) indicating the m value, and may not be limited thereto.

Figure 16:
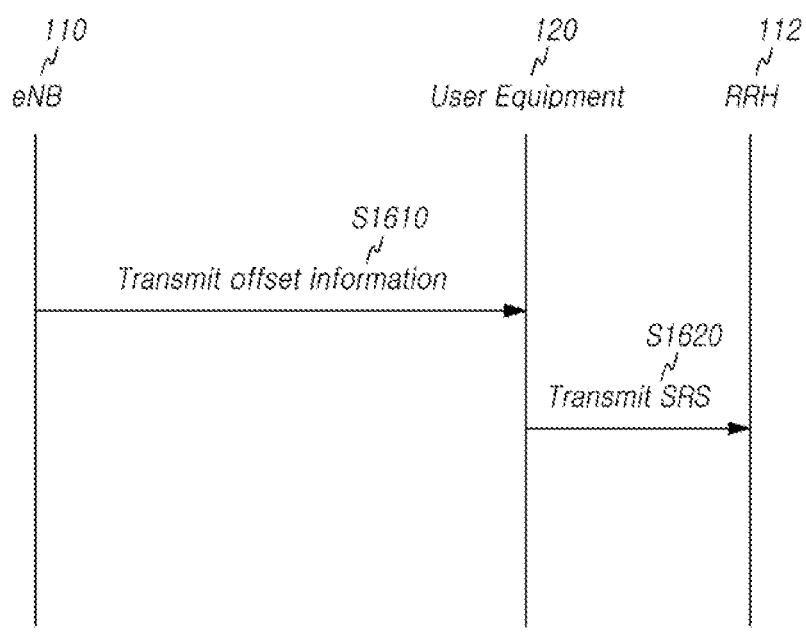
FIG. 16 is a flowchart illustrating a method of controlling a transmit power of an uplink sounding reference signal in user equipment in accordance with other embodiments.

FIG. 16 is a flowchart illustrating a method of controlling a transmit power of an uplink SRS in user equipment in accordance with other embodiments.

Referring to FIG. 16, in a method of controlling an uplink SRS transmit power in user equipment 120 according to other embodiments, user equipment 120 may receive offset information through time-frequency resources from a transmission/reception point (e.g., eNB 110) at step S1610. Herein, the offset information may indicate a specific offset value for an uplink SRS transmit power of user equipment 120. The specific offset value may be determined by the transmission/reception point (e.g., eNB 110) such that a controllable range of an SRS transmit power can be extended. At step S1620, user equipment 120 may transmit the uplink SRS with an uplink SRS transmit power. Herein, the uplink SRS transmit power may be determined based on the specific offset value indicated by the offset information.

At step S1610, user equipment 120 may receive the offset information indicating an offset value determined by the transmission/reception point (e.g., eNB 110), through time-frequency resources. User equipment 120 may receive the offset information through higher-layer signaling such as RRC messages, from the transmission/reception point (e.g., eNB 110).

As shown in FIG. 16, at step S1620, a receiving subject of an SRS may not be a serving transmission/reception point (e.g., eNB 110) but a different transmission/reception point (e.g., RRH 112). Herein, the different transmission/reception point may be indicated by a reference signal identity for an SRS sequence generation, as described above. Alternatively, the receiving subject of the SRS may be a serving transmission/reception point (e.g., eNB 110).

Figure 17:
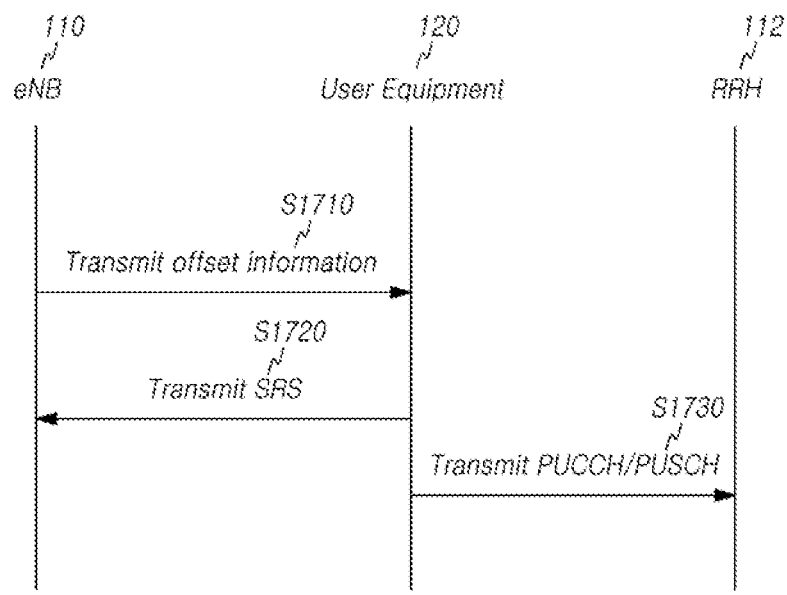
FIG. 17 illustrates transmitting an SRS to a serving transmission/reception point according to a method of controlling a transmit power of an uplink sounding reference signal in accordance with at least one embodiment.

FIG. 17 illustrates transmitting an SRS to a serving transmission/reception point according to a method of controlling a transmit power of an uplink SRS in accordance with at least one embodiment.

Referring to FIG. 17, in a transmit power control method of the uplink SRS in user equipment 120 according to other embodiments, user equipment 120 may receive offset information through time-frequency resources from a transmission/reception point (e.g., eNB 110) at step S1710. Herein, the offset information may indicate a specific offset value for an uplink SRS transmit power of user equipment 120. The specific offset value may be determined by the transmission/reception point (e.g., eNB 110) such that a controllable range of an SRS transmit power can be extended. At step S1720, user equipment 120 may transmit the uplink SRS with an uplink SRS transmit power. Herein, the uplink SRS transmit power may be determined based on the specific offset value indicated by the offset information. At step S1730, an uplink data channel may be transmitted to RRH 112.

At step S1710, user equipment 120 may receive the offset information indicating an offset value determined by the transmission/reception point (e.g., eNB 110), through time-frequency resources. User equipment 120 may receive the offset information through higher-layer signaling such as RRC messages, from the transmission/reception point (e.g., eNB 110).

As described above, the offset information may include a first parameter defining a first range using a constant step size, and a second parameter defining a second range using the constant step size. When Ks=1.25, the first parameter may define the first range corresponding to about [−3, 12] dB, using about 1 dB step size. When Ks=0, the first parameter may define the first range corresponding to about [−10.5, 12] dB, using about 1.5 dB step size. Accordingly, the first parameter may have a total of 4 bits (e.g., 0000 to 1111). When Ks=1.25, the second parameter may define the second range corresponding to about (12, 28] dB, using about 1 dB step size. When Ks=0, the second parameter may define the second range corresponding to about (12, 28.5] dB, using about 1.5 dB step size. Herein, the second parameter may be a 5-bit parameter (e.g., 00000 to 11111) such that an entire range including the first and the second ranges can be defined. However, in order to define the second range, the second parameter may use only the values "10000 to 11111" corresponding to the second range, among 5-bit values.

In the case that m in $P_{SRS\_OFFSET,c}(m)$ is determined to be m=0, m=1, or m≥2, a transmission/reception point may include information indicating "m" values, in the offset information. For example, when m=0, 1, 2, 3, 4, or 5, the offset information may include a specific bit (e.g., 3 bits) indicating the m value, and may not be limited thereto.

At step S1720, user equipment 120 may transmit the uplink SRS with an uplink SRS transmit power. Herein, the uplink SRS transmit power may be determined based on the specific offset value indicated by the offset information.

User equipment may transmit an uplink SRS to a transmission/reception point, with a UE transmit power $P_{SRS}$ for the SRS transmitted on subframe i. Herein, the UE transmit power $P_{SRS}$ for the SRS transmitted on subframe i may be defined by Formula 7 using a specific offset value indicated by offset information.

In Formula 7, in the case of Ks=1.25, the offset value $P_{SRS\_OFFSET,c}(m)$ may be defined using about 1 dB step size in an entire range including a first range and a second range. Herein, the first range may be about [−3, 12] dB indicated by a first parameter. The second range may be about (12, 28] dB indicated by a second parameter. Meanwhile, in the case of Ks=0, the offset value $P_{SRS\_OFFSET,c}(m)$ may be defined using about 1.5 dB step size in an entire range including a first range and a second range. Herein, the first range may be about [−10.5, 12] dB indicated by a first parameter. The second range may be about (12, 28.5] dB indicated by a second parameter.

As described above, a method of controlling an SRS transmit power in accordance with at least one embodiment may extend a range of transmit power indicated by offset values. Alternatively, a method of controlling an SRS transmit power according to other embodiments may determine the parameter $PL_c$ corresponding to a pathloss estimate in Formula 7, More specifically, the pathloss estimate $PL_c$ may be estimated using "channel-state information—reference symbol" (CSI-RS). Alternatively, the pathloss estimate $PL_c$ may be estimated using both a cell-specific RS (CRS) and CSI-RS used in a downlink.

First, a pathloss may be estimated using CSI-RS used in a downlink.

In at least one embodiment, the pathloss corresponding to a power control parameter for an uplink channel transmission and/or an uplink signal transmission may be estimated using non-zero power CSI-RS resources and zero-power CSI-RS resources. Herein, the non-zero power CSI-RS resources and the zero-power CSI-RS resources may be UE-specifically determined. In other words, the non-zero power CSI-RS resources may be used to estimate a pathloss of a downlink through which corresponding user equipment receives PDCCH or PDSCH. Meanwhile, the zero-power CSI-RS resources may not be used to estimate a pathloss of a downlink through which the PDCCH or the PDSCH is received. However, the zero-power CSI-RS resources may be considered to estimate a pathloss in a specific CoMP measurement set. Accordingly, in this case, when controlling a transmit power of uplink physical channels and/or uplink signals, user equipment may properly use the estimated pathloss in accordance with a target transmission/reception point.

In other embodiments, a pathloss may be estimated using interference measurement resources (IMRs), among CSI-RS resources transmitted UE-specifically in a downlink. In this case, the IMRs may not be used to estimate a pathloss of a downlink through which the PDCCH or the PDSCH is received. However, the IMRs may be considered to estimate a pathloss in a specific CoMP measurement set. Accordingly, in this case, when controlling a transmit power of uplink physical channels and/or uplink signals, user equipment 120 may properly use the estimated pathloss in accordance with a target transmission/reception point.

As described above, a pathloss may be estimated using both a cell-specific RS (CRS) and CSI-RS used in a downlink.

In at least one embodiment, user equipment 120 may estimate a pathloss of a downlink through which PDCCH or PDSCH is received, using a cell-specific reference signal (CRS). Herein, the cell-specific reference signal (CRS) may be a reference signal defined cell-specifically. Meanwhile, zero-power CSI-RS resources and non-zero power CSI-RS resources determined UE-specifically may not be used to estimate a pathloss of a downlink through which the PDCCH or the PDSCH is received. However, the zero-power CSI-RS resources and/or the non-zero power CSI-RS resources may be considered to estimate a pathloss associated with a different transmission/reception point. Accordingly, in this case, when controlling a transmit power of uplink physical channels and/or uplink signals, user equipment 120 may properly use the estimated pathloss in accordance with a target transmission/reception point. Herein, CSI-RS resources used to estimate the pathloss associated with the different transmission/reception point may be one of the zero-power CSI-RS resources and the non-zero power CSI-RS.

In other embodiments, user equipment 120 may estimate a pathloss of a downlink through which PDCCH or PDSCH is received, using a cell-specific reference signal (CRS). Non-zero power CSI-RS resources may be used to amend a pathloss estimation performed using the CRS. Meanwhile, zero-power CSI-RS resources may not be used to estimate a pathloss of a downlink through which the PDCCH or the PDSCH is received. However, the zero-power CSI-RS resources may be considered to estimate a pathloss in a specific CoMP measurement set. Accordingly, in this case, when controlling a transmit power of uplink physical channels and/or uplink signals, user equipment 120 may properly use the estimated pathloss in accordance with a target transmission/reception point.

In still other embodiments, user equipment 120 may estimate a pathloss of a downlink through which PDCCH or PDSCH is received, using a cell-specific reference signal (CRS). Non-zero power CSI-RS resources may be used to amend a pathloss estimation performed using the CRS. Meanwhile, a pathloss may be estimated using interference measurement resources (IMRs), among CSI-RS resources transmitted UE-specifically. In this case, the IMRs may not be used to estimate a pathloss of a downlink through which the PDCCH or the PDSCH is received. However, the IMRs may be considered to estimate a pathloss in a specific CoMP measurement set. Accordingly, in this case, when controlling a transmit power of uplink physical channels and/or uplink signals, user equipment 120 may properly use the estimated pathloss in accordance with a target transmission/reception point.

As described above, a method of estimating a pathloss using both CRS and CSI-RS used in a downlink may perform a pathloss estimation using an additional CSI-RS, for only a new user equipment, without affecting a transmit power control of an existing user equipment. Herein, the new user equipment represents user equipment capable of employing a new configuration for a pathloss estimation. The existing user equipment may perform uplink/downlink transmissions in connection with a same transmission/reception point.

As described above, a method according to embodiments may efficiently extend a controllable range of SRS transmit power and amend a pathloss estimate, while sustaining compatibility with the existing user equipment and an existing network system.

As described above, in a wireless communication system to which embodiments may be applied, a receiving subject of an SRS may be a serving transmission/reception point (e.g., eNB 110) performing a downlink transmission to user equipment. Alternatively, the receiving subject of the SRS may be a different transmission/reception point (e.g., RRH 112) depending on cases. Accordingly, in the case that the receiving subject of the SRS is changed, it is necessary to efficiently determine an SRS transmit power in an extended controllable range of the SRS transmit power. In other words, the SRS transmit power may be efficiently controlled according to whether or not a receiving subject (i.e., a target transmission/reception point) of the SRS is a serving transmission/reception point (e.g., eNB 110). Hereinafter, a control method of an SRS transmit power will be separately described according to whether or not the receiving subject of the SRS is the serving transmission/reception point.

In an SRS transmit power control procedure performed in a wireless communication system according to the present embodiments, an SRS transmit power may be differently determined according to the following cases: i) an SRS is transmitted to a serving transmission/reception point (e.g., eNB 110) performing a downlink transmission to user equipment 120, as described with reference to FIG. 2 and FIG. 3; and ii) a receiving subject (i.e., a target transmission/reception point) of the SRS is a different transmission/reception point, as described with reference with FIG. 7 to FIG. 14.

In the case of determining an SRS transmit power, information on a receiving subject (i.e., a target transmission/reception point) of an SRS may be explicitly indicated. Herein, the information on the receiving subject may be information on whether the receiving subject is the same as or different from a transmission/reception point transmitting PUSCH.

For an SRS transmission of user equipment 120, a transmission/reception point (e.g., eNB 110) may transmit bit-specific information (e.g., 1-bit information) to user equipment 120 such that a transmit power of an SRS transmitted to a receiving subject by user equipment 120 may be semi-statically determined. Herein, the bit-specific information may be defined in RRC parameters through explicit signaling. Furthermore, the bit-specific information may indicate whether a receiving subject is a serving transmission/reception point (e.g., eNB 110). Alternatively, the transmission/reception point (e.g., eNB 110) may further include indication information in PDCCH through an additional signaling such that a transmit power of an SRS transmitted by user equipment 120 may be dynamically determined. Herein, the indication information may be information on whether a receiving subject is a serving transmission/reception point (e.g., eNB 110).

When determining an SRS transmit power from such explicit signaling, user equipment 120 may use one of the following determination procedures: i) a first procedure may determine the SRS transmit power based on a parameter associated with transmit power control information for PUSCH and a downlink pathloss estimate associated with a serving transmission/reception point (e.g., eNB 110); and ii) a second procedure may determine the SRS transmit power according to an additional control method of an SRS transmit power. More specifically, the second procedure may determine the SRS transmit power, without association with the transmit power control information for PUSCH. That is, the second procedure may determine the SRS transmit power such that association with the PUSCH is released. In other words, in the second procedure, the parameter associated with the transmit power control information for the PUSCH and the down pathloss estimate associated with the serving transmission/reception point (e.g., eNB 110) may not be used when determining the SRS transmit power. Accordingly, user equipment 120 may recognize that an SRS has been determined to be transmitted to a transmission/reception point different from a serving transmission/reception point (e.g., eNB 110), and may transmit the SRS to the corresponding different transmission/reception point.

In the case of the second procedure, an SRS transmit power may be independently determined without association with transmit power control information for PUSCH. For example, offset information may be defined such that an SRS transmit power is determined in an extended range as described above. Herein, the extended range may be an entire range including a first range and a second range (i.e., an extended range) for the value m used for determination of $P_{SRS\_OFFSET,c}(m)$. Alternatively, offset information may be defined such that an SRS transmit power is determined in a controllable range of an SRS transmit power for additional m values (e.g., m=2, 3, 4, . . . ) other than m=0 and m=1. Alternatively, as described above, an SRS transmit power may be determined based on a pathloss estimate amended using at least one of UE-specific CSI-RS and cell-specific RS (CRS).

In this case, if further indication information is not provided by explicit signaling, user equipment 120 may recognize that an SRS has been determined to be transmitted to a serving transmission/reception point (e.g., eNB 110). When transmitting the SRS, configuration for an SRS transmit power control may be defined using a parameter associated with transmit power control for PUSCH. Offset values may be designated in a first range corresponding to a typical range. Furthermore, a downlink pathloss estimate associated with the serving transmission/reception point (e.g., eNB 110) may be used as a pathloss estimate without amendment. Accordingly, in the case that the SRS and other uplink channels are simultaneously transmitted, compatibility with user equipment operating in a typical manner may be possible. Herein, the other uplink channels may include an uplink data channel (e.g., PUSCH) and/or an uplink control channel (e.g., PUCCH, and/or PRACH).

As described above, whether a receiving subject of an SRS is a serving transmission/reception point may be implicitly indicated without explicit signaling.

In the case of explicit signaling, $n_{ID}^{RS}$ for base sequence generation of an SRS may be independently defined in RRC parameters without overhead. More specifically, the independent $n_{ID}^{RS}$ may be defined without an additional RRC parameter for indicating a power control operation of user equipment 120. In addition, the independent $n_{ID}^{RS}$ may be defined without an additional overhead associated with PDCCH signaling for identifying power control operations. Thus, user equipment 120 may recognize that an aperiodic SRS has been determined to be transmitted to a transmission/reception point different from the serving transmission/reception point (e.g., eNB 110), through configuration information for an aperiodic SRS generation. Herein, the configuration information may be received through PDCCH with DCI format 0 from the serving transmission/reception point (e.g., eNB 110). The configuration information may include 'trigger information bits' for an aperiodic SRS transmission. Herein, the trigger information bits may be indication information having a length of 1 bit. As described above, in the case that user equipment 120 recognizes that a target transmission/reception point (i.e., a receiving subject) of the SRS has been determined to be a different transmission/reception point, offset values for an SRS transmit power may be determined in an entire range including a first range (i.e., a typical range) and a second range (i.e., an extended range). Alternatively, the SRS transmit power may be determined based on a pathloss estimate amended using at least one of UE-specific CSI-RS and cell-specific RS (CRS).

In other embodiments, like a case of triggering an aperiodic reference signal transmission through DCI format 0, even in the case that an aperiodic reference signal transmission is triggered through DCI format 1a, 2b, or 2c, $n_{ID}^{RS}$ may be independently defined for transmit power control of a corresponding aperiodic SRS. In this case, user equipment 120 may determine transmit power and/or a power control scheme for the aperiodic SRS, independently from power control for PUSCH. That is, parameters associated with the PUSCH may not be used to determine an SRS transmit power. Furthermore, an SRS transmit power may be determined by an additional control method for the SRS transmit power according to the present embodiment. Herein, the additional control method may determine offset information in an entire range including a first range (i.e., a typical range) and a second range (i.e., an extended range). Alternatively, the additional control method may determine an SRS transmit power, based on a pathloss estimate amended using at least one of UE-specific CSI-RS and cell-specific RS (CRS).

In still other embodiments, in the case that an aperiodic reference signal transmission is triggered through DCI format 4, $n_{ID}^{RS}$ for SRS base sequence generation may be independently defined for transmit power control of a corresponding aperiodic SRS. Herein, the $n_{ID}^{RS}$ may be determined in RRC parameters of an aperiodic SRS, through 2-bit indication information of PDCCH. The 2-bit indication information of the PDCCH may be used when transmit power control for the aperiodic SRS is performed. Thus, user equipment 120 may recognize that the aperiodic SRS has been determined to be transmitted to a transmission/reception point different from the serving transmission/reception point (e.g., eNB 110), through configuration information for an aperiodic SRS generation. Herein, the configuration information may be received through PDCCH with DCI format 4 from the serving transmission/reception point (e.g., eNB 110). The configuration information may include 'trigger information bits' for an aperiodic SRS transmission. Herein, the trigger information bits may be indication information having a length of 2 bits. In this case, user equipment 120 may determine a transmit power and/or a power control scheme for the aperiodic SRS independently from PUSCH such that the aperiodic SRS can be transmitted to the different transmission/reception point. That is, parameters associated with the PUSCH may not be used to determine an SRS transmit power. Furthermore, an SRS transmit power may be determined according to an additional control method for the SRS transmit power. Herein, the additional control method may determine offset information in an extended range, as described above. Alternatively, the additional control method may determine an SRS transmit power, based on a pathloss estimate amended using at least one of UE-specific CSI-RS and cell-specific RS (CRS).

In the case that $n_{ID}^{RS}$ is independently determined as described above, $n_{ID}^{RS}$ may be directly included in RRC parameters. Herein, a range of corresponding $n_{ID}^{RS}$ may be {0~509} or {0~503}. Alternatively, unlike an above-described method directly including the RRC parameters, a sequence group number and a sequence number for SRS sequence generation may be designated. Herein, base sequences used for an SRS transmission may be defined and derived from Formula 1 and Formula 6. Formula 1 and Formula 6 may be defined based on a sequence group number and a sequence number in sequence-group hopping and sequence hopping.

Meanwhile, independent $n_{ID}^{RS}$ for base sequence generation of an SRS may not be defined. Although $n_{ID}^{RS}$ is defined, $n_{ID}^{RS}$ may be determined to be the same as a physical cell identity $N_{ID}^{cell}$ of a serving transmission/reception point (e.g., eNB 110). In these cases, user equipment 120 may recognize that an aperiodic SRS has been determined to be transmitted to a serving transmission/reception point (e.g., eNB 110), from 'trigger information bits' for transmission of aperiodic reference signals. Herein, the trigger information bits may be included in PDCCH with one of DCI format 0, DCI format 1a/2b/2c, and DCI format 4. The PDCCH may be received from the serving transmission/reception point (e.g., eNB 110). The trigger information bits may include indication information having a length of 1 bit or 2 bits. The 1-bit indication information may correspond to DCI format 0 or DCI format 1a/2b/2c. The 2-bit indication information may correspond to DCI format 4. When transmitting the aperiodic SRS to the serving transmission/reception point (e.g., eNB 110), user equipment 120 may determine SRS transmit power, using parameters associated with PUSCH.

Accordingly, in the case that the SRS and other uplink channels are simultaneously transmitted, compatibility with a typical system may be possible by allowing existing user equipment to operate in a typical manner. Herein, the other uplink channels may include at least one of an uplink data channel (e.g., PUSCH) and an uplink control channel (e.g., PUCCH, and/or PRACH).

Figure 18:
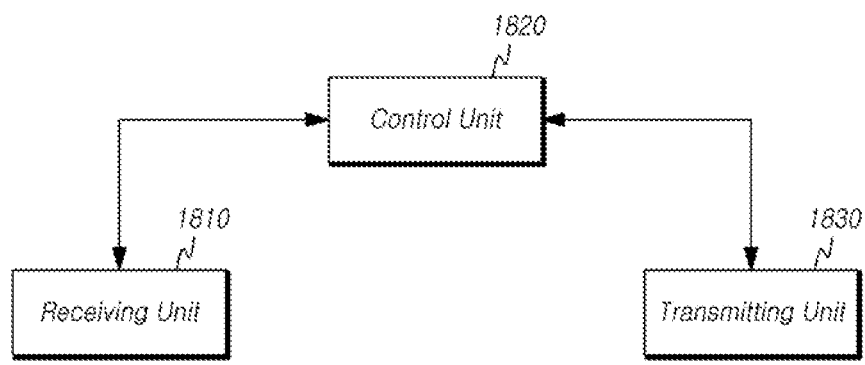
FIG. 18 is a diagram illustrating a transmission/reception point in accordance with still other embodiments.

FIG. 18 is a diagram illustrating a transmission/reception point in accordance with still other embodiments.

Referring to FIG. 18, a transmission/reception point according to the present embodiment may include receiving unit 1810, control unit 1820, and transmitting unit 1830.

Control unit 1820 may control operations of the transmission/reception point, according to a CoMP operation and an uplink reference signal transmission required for performing the present embodiment.

As described above, in order to control an uplink SRS transmit power of user equipment, control unit 1820 may determine an offset value for the uplink SRS transmit power of the user equipment. More specifically, control unit 1820 may determine the offset value using a constant step size in an entire range including a first range and a second range. Herein, the first range may be a typical range. The second range may include comparatively larger values than the first range.

Transmitting unit 1830 and receiving unit 1810 may transmit or receive signals, messages, and/or data required for performing the above-described present embodiments, in connection with user equipment.

Transmitting unit 1830 may transmit offset information to user equipment through time-frequency resources. Herein, the offset information may indicate offset values determined by control unit 1820.

Figure 19:
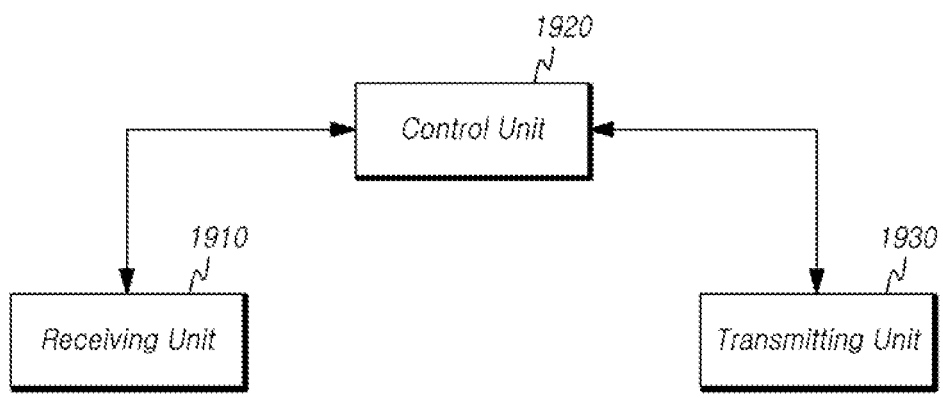
FIG. 19 is a block diagram illustrating user equipment in accordance with still other embodiments.

FIG. 19 is a block diagram illustrating user equipment in accordance with still other embodiments.

Referring to FIG. 19, user equipment according to the present embodiment may include receiving unit 1910, control unit 1920, and transmitting unit 1930.

Receiving unit 1910 may receive control information, data, and/or messages through a downlink channel from a transmission/reception point.

The control information received by receiving unit 1910 may include offset information indicating an offset value. Herein, the offset value may be used to specify an uplink SRS transmit power using a constant step size in an entire range including a first range and a second range. Herein, the first range may be a typical range. The second range may be comparatively larger than the first range.

Control unit 1920 may determine transmit power for an uplink SRS, based on the offset information received by receiving unit 1910. That is, control unit 1920 may perform an SRS transmit power control such that an uplink SRS can be transmitted with uplink SRS transmit power determined based on offset values indicated by the offset information.

Transmitting unit 1930 may transmit an uplink SRS with an uplink SRS transmit power determined by control unit 1920.

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the attached documents below may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of controlling a transmit power of an uplink sounding reference signal (SRS) in a transmission/reception point, the method comprising:

determining an offset value for an uplink SRS transmit power of user equipment, using a constant step size in an entire range including a first range and a second range, wherein the first range is a base range, and the second range includes comparatively larger values than the first range; and transmitting offset information indicating the determined offset value to the user equipment through a higher-layer signaling, wherein when a parameter Ks defined by the higher-layer signaling of the transmission/reception point is 1.25, the entire range is [−3, 28] dB, the first range is [−3, 12] dB, the second range is (12, 28] dB, and the constant step size is 1 dB; and when the parameter Ks=0, the entire range is [−10.5, 28.5] dB, the first range is [−10.5, 12] dB, the second range is (12, 28.5] dB, and the constant step size is 1.5 dB.

2. The method of claim 1, wherein the offset information includes:

a first parameter defining the first range using the constant step size; and a second parameter defining the second range using the constant step size.

3. The method of claim 1, wherein the uplink SRS is at least one of a periodic uplink SRS and an aperiodic uplink SRS.

4. A transmission/reception point comprising:

a control unit configured to determine an offset value for a transmit power of an uplink SRS of user equipment, using a constant step size in an entire range including a first range and a second range, wherein the first range is a base range, and the second range includes comparatively larger values than the first range; and a transmitting unit configured to transmit offset information indicating the determined offset value to the user equipment through a higher-layer signaling, wherein when a parameter Ks defined by the higher-layer signaling of the transmission/reception point is 1.25, the entire range is [−3, 28] dB, the first range is [−3, 12] dB, the second range is (12, 28] dB, and the constant step size is 1 dB; and when the parameter Ks=0, the entire range is [−10.5, 28.5] dB, the first range is [−10.5, 12] dB, the second range is (12, 28.5] dB, and the constant step size is 1.5 dB.

5. The transmission/reception point of claim 4, wherein the offset information includes:

a first parameter defining the first range using the constant step size; and a second parameter defining the second range using the constant step size.

6. The transmission/reception point of claim 4, wherein the uplink SRS is at least one of a periodic uplink SRS and an aperiodic uplink SRS.

* * * * *